(12) United States Patent
Ohlsson et al.

(10) Patent No.: US 11,218,880 B2
(45) Date of Patent: Jan. 4, 2022

(54) CONTROL SIGNALING IN A WIRELESS COMMUNICATION SYSTEM

(71) Applicant: Telefonaktiebolaget LM Ericsson (publ), Stockholm (SE)

(72) Inventors: Oscar Ohlsson, Stockholm (SE); Icaro L. J. da Silva, Solna (SE); Gunnar Mildh, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 469 days.

(21) Appl. No.: 16/093,908

(22) PCT Filed: Jun. 19, 2018

(86) PCT No.: PCT/SE2018/050651
§ 371 (c)(1),
(2) Date: Oct. 15, 2018

(87) PCT Pub. No.: WO2019/004901
PCT Pub. Date: Jan. 3, 2019

(65) Prior Publication Data
US 2020/0084634 A1 Mar. 12, 2020

Related U.S. Application Data

(60) Provisional application No. 62/525,163, filed on Jun. 26, 2017.

(51) Int. Cl.
*G06F 11/00* (2006.01)
*G06F 12/14* (2006.01)
(Continued)

(52) U.S. Cl.
CPC ....... *H04W 12/106* (2021.01); *H04L 63/1458* (2013.01); *H04W 12/121* (2021.01); *H04W 12/61* (2021.01)

(58) Field of Classification Search
CPC ... H04W 12/61; H04W 12/106; H04W 12/10; H04W 12/00502
See application file for complete search history.

(56) References Cited

U.S. PATENT DOCUMENTS

2001/0012270 A1* 8/2001 Godoroja ............. H04L 47/263
370/230
2004/0229626 A1* 11/2004 Yi .......................... H04W 76/10
455/450
(Continued)

FOREIGN PATENT DOCUMENTS

WO WO-2017135702 A1 * 8/2017 ............ H04W 60/00

OTHER PUBLICATIONS

3GPP, "3rd Generation Partnership Project; Technical Specification Group Core Network and Terminals; Mobile radio interface Layer 3 specification; Core network protocols; Stage 3 (Release 9)", 3GPP TS 24.008 V9.2.0, Mar. 2010, 1-14.
(Continued)

*Primary Examiner* — Phy Anh T Vu
(74) *Attorney, Agent, or Firm* — Christopher & Weisberg, P.A.

(57) ABSTRACT

A wireless communication device (16) is configured for use in a wireless communication system (10). The wireless communication device (16) is configured to receive control signaling (22) that indicates a certain wait time (24) for which the wireless communication device (16) is required to wait before sending a certain control message (20) to network equipment (18). A subset of possible wait times must be indicated by integrity-protected control signaling. The wireless communication device (16) may therefore also be configured to accept or reject the certain wait time (24) as being required before sending the certain control message (20), based on whether the received control signaling (22) was integrity protected and on whether the certain wait time (Continued)

(24) is included in the subset of possible wait times which must be indicated by integrity-protected control signaling.

26 Claims, 11 Drawing Sheets

(51) Int. Cl.
*G06F 12/16* (2006.01)
*G08B 23/00* (2006.01)
*H04W 12/106* (2021.01)
*H04L 29/06* (2006.01)
*H04W 12/61* (2021.01)
*H04W 12/121* (2021.01)

(56) References Cited

U.S. PATENT DOCUMENTS

| | | | | |
|---|---|---|---|---|
| 2008/0205370 A1* | 8/2008 | Bae | ............ | H04W 28/10 370/345 |
| 2009/0017863 A1* | 1/2009 | Rowley | ............ | H04L 63/20 455/550.1 |
| 2011/0268092 A1 | 11/2011 | Tiwari | | |
| 2012/0269122 A1* | 10/2012 | Lee | ............ | H04W 76/36 370/328 |
| 2012/0287851 A1* | 11/2012 | Lee | ............ | H04W 48/02 370/328 |
| 2013/0201823 A1* | 8/2013 | Gupta | ............ | H04W 28/0289 370/230 |
| 2014/0153408 A1* | 6/2014 | Jun | ............ | H04L 65/1006 370/250 |
| 2016/0262159 A1* | 9/2016 | Puddle | ............ | H04W 68/005 |
| 2017/0238278 A1* | 8/2017 | Yadav | ............ | H04W 68/04 370/329 |
| 2018/0220302 A1* | 8/2018 | Chen | ............ | H04W 48/06 |
| 2020/0196186 A1* | 6/2020 | Gupta | ............ | H04W 28/0289 |
| 2020/0214070 A1* | 7/2020 | Ingale | ............ | H04W 74/0833 |
| 2021/0160953 A1* | 5/2021 | Mildh | ............ | H04W 68/005 |

OTHER PUBLICATIONS

3GPP, "3rd Generation Partnership Project; Technical Specification Group Core Network and Terminals; Non-Access-Stratum (NAS) protocol for Evolved Packet System (EPS); Stage 3 (Release 14)", 3GPP TS 24.301 V14.4.0, Jun. 2017, 1-486.

3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.2.2, Apr. 2017, 1-721.

Unknown, Author, "Correction of handling NAS reject messages without integrity protection", 3GPP TSG-CT WG1 Meeting #96, C1-161550, Jeju (Korea), Feb. 15-19, 2016, 1-22.

* cited by examiner

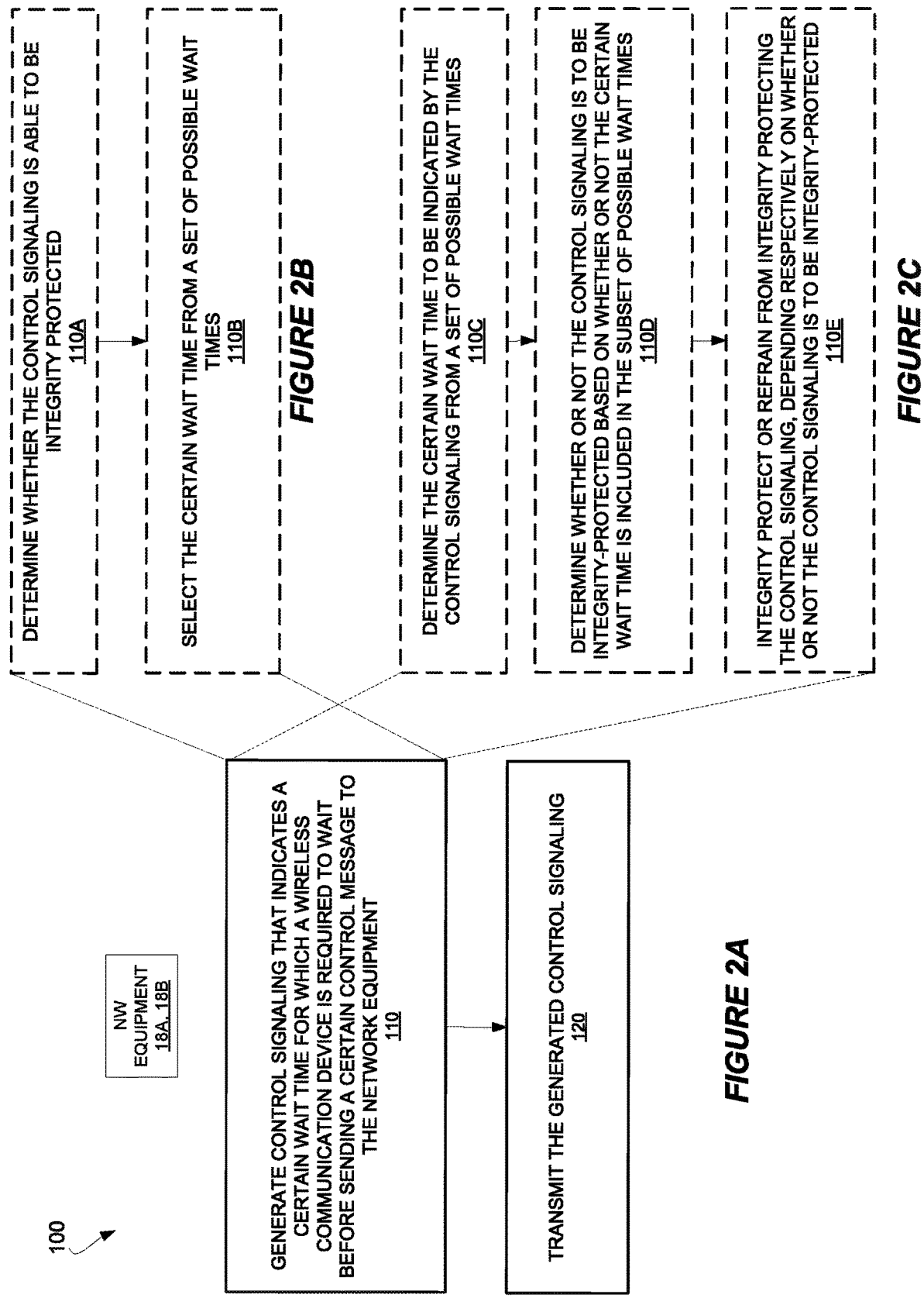

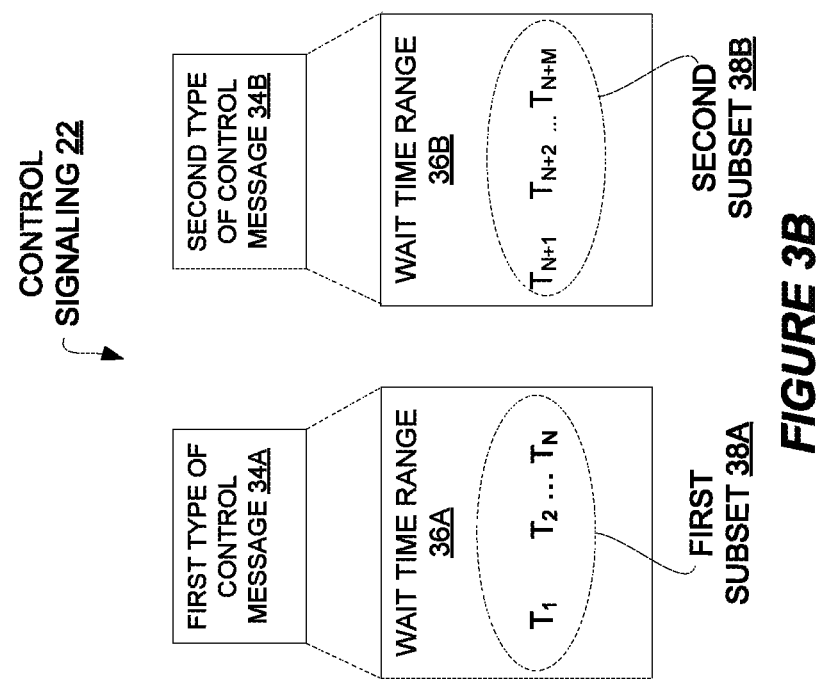
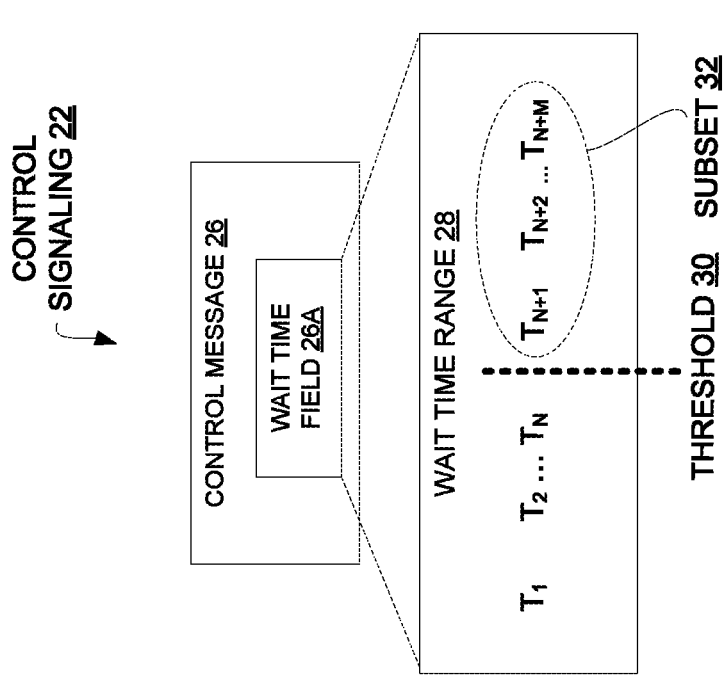
FIGURE 3A
FIGURE 3B

CONTROL SIGNALING IN A WIRELESS COMMUNICATION SYSTEM

TECHNICAL FIELD

The present application relates generally to a wireless communications system, and relates more particularly to control signaling in such a wireless communication system.

BACKGROUND

One of the aims with 5$^{th}$ Generation (5G) cellular networks is to improve the resilience against fake base station attacks, which could be used to launch Denial of Service (DoS) attacks against user equipments (UEs).

Jamming is the most common way of launching a DoS attack against a cellular network. In such an attack, the attacker might transmit a strong radio signal on a frequency to be jammed. This overloads receivers and makes it impossible for the receivers to detect other signals on that frequency. The impact of such an attack is very local and mainly constrained by the transmitted power of the jamming device. The attack is also limited in time and only lasts while the jamming device is turned on and transmitting. The fact that the attacker needs to be present during the entire attack makes the attack easier to detect.

More sophisticated DoS attacks exploit vulnerabilities in the protocols used for the control signaling between the user and cellular network. By setting up a false base station, the attacker can intercept the control signaling and inject specially crafted messages to cause more persistent DoS. Since the effect of the attack continues even after the attacker is gone, the attacker bears less risk of being caught. Additionally, the attack might be harder for the network operator or authorities to detect than brute-force radio jamming. Guarding against these sophisticated attacks requires avoiding or mitigating the sort of vulnerabilities in control signaling protocols that the attacks exploit.

SUMMARY

According to one or more embodiments herein, control signalling that indicates a time for which a wireless communication device is required to wait before sending a certain control message (e.g., a radio resource control, RRC, connection request message) must be integrity protected if the time indicated is included in a defined subset (e.g., above a defined threshold). In some embodiments, this means the range of the time that may be indicated by the control signalling is limited for non-integrity protected messages, e.g., such that only relatively smaller times may be indicated. Limiting the range indicatable by non-integrity protected messages may for example mitigate DOS attacks that would otherwise exploit such signalling.

Some embodiments for example include a method performed by a wireless communication device configured for use in a wireless communication system. The method may comprise receiving control signaling that indicates a certain wait time for which the wireless communication device is required to wait before sending a certain control message to network equipment. The method may also comprise accepting or rejecting the certain wait time as being required before sending the certain control message, based on whether the received control signaling was integrity protected and on whether the certain wait time is included in a subset of possible wait times which must be indicated by integrity-protected control signaling. In some embodiments, the subset of possible wait times includes possible wait times that exceed a threshold and excludes possible wait times that do not exceed the threshold, e.g., such that wait times exceeding the threshold must be indicated by integrity-protected control signaling.

In some embodiments, for example, the method comprises rejecting the certain wait time responsive to the received control signaling not being integrity protected and the certain wait time being included in the subset. Or, the method comprises accepting the certain wait time responsive to either the received control signaling being integrity protected or the certain wait time not being included in the subset.

In some embodiments, the control signaling comprises a message with a time field that indicates the certain wait time. The time field may encode possible wait times within a range, with possible wait times within the range that exceed a threshold being included in the subset and possible wait times within the range that do not exceed the threshold being excluded from the subset. In this case, the method may further comprise determining whether the certain wait time is included in the subset by determining whether the certain wait time exceeds the threshold.

In other embodiments, a first type of control message is defined for indicating a time within a first subset of possible wait times, and a second type of control message is defined for indicating a time within a second subset of possible wait times. In this case, the second subset is the subset of possible wait times which must be indicated by integrity-protected control signaling. The method may further comprise determining whether the certain wait time is included in the subset of possible wait times which must be indicated by integrity-protected control signaling by determining which of the first and second types of control messages the control signaling comprises.

In still other embodiments, a first type of signaling radio bearer is defined for indicating a first subset of possible wait times, and a second type of signaling radio bearer is defined for indicating a time within a second subset of possible wait times. In this case, the second subset is the subset of possible wait times which must be indicated by integrity-protected control signaling. The method may further comprise determining whether the certain wait time is included in the subset of possible wait times which must be indicated by integrity-protected control signaling by determining on which of the first and second types of signaling radio bearers the control signaling is received.

In yet other embodiments, a first timer at the wireless communication device is defined for timing a time within a first subset of possible wait times, and a second timer at the wireless communication device is defined for timing a time within a second subset of possible wait times. In this case, the second subset is the subset of possible wait times which must be indicated by integrity-protected control signaling. The method may further comprise determining whether the certain wait time is included in the subset of possible wait times which must be indicated by integrity-protected control signaling by determining which of the first and the second timers the control signaling indicates the wireless communication device is to configure for sending the certain control message.

In some of these embodiments, each possible wait time in the second subset may be greater than each possible wait time in the first subset.

In some embodiments, the method further comprises, responsive to rejecting the certain wait time, ignoring the certain wait time as being required before sending the certain control message, using a default wait time as being required before sending the certain control message, triggering an error handling procedure, and/or notifying a certain protocol layer of said rejecting.

In other embodiments, the method further comprises, responsive to accepting the certain wait time, sending the certain control message after waiting the certain wait time.

In some embodiments, the certain control message is a radio resource control, RRC, connection request message or an RRC connection resume request message. Alternatively or additionally, the control signaling is an RRC connection reject message or an RRC connection release message from a radio access network of the wireless communication system.

Other embodiments include a method performed by network equipment configured for use in a wireless communication system. The method may comprise generating control signaling that indicates a certain wait time for which a wireless communication device is required to wait before sending a certain control message to the network equipment. Such generating comprises determining the certain wait time and/or whether to integrity protect the control signaling based on a rule that a subset of possible wait times must be indicated by integrity-protected control signaling. The method may also comprise transmitting the generated control signaling.

In some embodiments, such generating comprises determining whether the control signaling is able to be integrity protected, and selecting the certain wait time from a set of possible wait times that includes or excludes the subset of possible wait times that must be indicated by integrity-protected control signaling, depending respectively on whether or not the control signaling is able to be integrity protected.

In other embodiments, such generating comprises determining the certain wait time to be indicated by the control signaling from a set of possible wait times. Generating may also comprise determining whether or not the control signaling is to be integrity-protected based on whether or not the certain wait time is included in the subset of possible wait times that must be indicated by integrity-protected control signaling. In this case, generating may involve integrity protecting the control signaling or refraining from integrity protecting the control signaling, depending respectively on whether or not the control signaling is to be integrity-protected according to said determining.

In some embodiments, the subset of possible wait times includes possible wait times that exceed a threshold and excludes possible wait times that do not exceed the threshold.

In some embodiments, the control signaling comprises a message with a time field that indicates the certain wait time. The time field may encode possible wait times within a range, with possible wait times within the range that exceed a threshold being included in the subset and possible wait times within the range that do not exceed the threshold being excluded from the subset. In this case, the method may further comprise determining whether the certain wait time is included in the subset by determining whether the certain wait time exceeds the threshold.

In other embodiments, a first type of control message is defined for indicating a time within a first subset of possible wait times, and a second type of control message is defined for indicating a time within a second subset of possible wait times. In this case, the second subset is the subset of possible wait times which must be indicated by integrity-protected control signaling. The method may comprise generating the control signaling to comprise the first or second type of control message based on whether the certain wait time is included in the subset of possible wait times which must be indicated by integrity-protected control signaling.

In still other embodiments, a first type of signaling radio bearer is defined for indicating a first subset of possible wait times, and a second type of signaling radio bearer is defined for indicating a time within a second subset of possible wait times. In this case, the second subset is the subset of possible wait times which must be indicated by integrity-protected control signaling. The method may further comprise transmitting the control signaling on the first or second type of signaling radio bearer based on whether the certain wait time is included in the subset of possible wait times which must be indicated by integrity-protected control signaling.

In yet other embodiments, a first timer at the wireless communication device is defined for timing a time within a first subset of possible wait times, and a second timer at the wireless communication device is defined for timing a time within a second subset of possible wait times. In this case, the second subset is the subset of possible wait times which must be indicated by integrity-protected control signaling. The method may further comprise generating the control signaling to configure the first or the second timer for sending the certain control message based on whether the certain wait time is included in the subset of possible wait times which must be indicated by integrity-protected control signaling.

In some of these embodiments, each possible wait time in the second subset may be greater than each possible wait time in the first subset.

In some embodiments, the certain control message is a radio resource control, RRC, connection request message or an RRC connection resume request message. Alternatively or additionally, the control signaling is an RRC connection reject message or an RRC connection release message from a radio access network of the wireless communication system.

In some embodiments, the network equipment comprises radio access network equipment (e.g., a base station).

Embodiments herein also include corresponding apparatus, computer programs, and carriers (e.g., non-transitory computer-readable mediums). For example, embodiments herein include a wireless communication device configured for use in a wireless communication system. The wireless communication device in some embodiments is configured (e.g., via processing circuitry and communication circuitry of the wireless communication device) to receive control signaling that indicates a certain wait time for which the wireless communication device is required to wait before sending a certain control message to network equipment. The wireless communication device may also be configured to accept or reject the certain wait time as being required before sending the certain control message, based on whether the received control signaling was integrity protected and on whether the certain wait time is included in a subset of possible wait times which must be indicated by integrity-protected control signaling.

Embodiments herein further include network equipment configured for use in a wireless communication system. The network equipment in some embodiments is configured (e.g., via processing circuitry and communication circuitry of the network equipment) to generate control signaling that indicates a certain wait time for which a wireless communication device is required to wait before sending a certain control message to the network equipment. Such generation may comprise determining the certain wait time and/or whether to integrity protect the control signaling based on a rule that a subset of possible wait times must be indicated by integrity-protected control signaling. The network equipment may also be configured to transmit the generated control signaling.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2A is a logic flow diagram of a method performed by network equipment according to some embodiments.

FIG. 2B is a logic flow diagram of processing for implementing a step of the method in FIG. 2A according to some embodiments.

FIG. 2C is a logic flow diagram of processing for implementing a step of the method in FIG. 2A according to other embodiments.

FIG. 3A is a block diagram of a control message with a wait time field according to some embodiments.

FIG. 3B is a block diagram of different types of control messages according to some embodiments.

DETAILED DESCRIPTION

Figure 1:
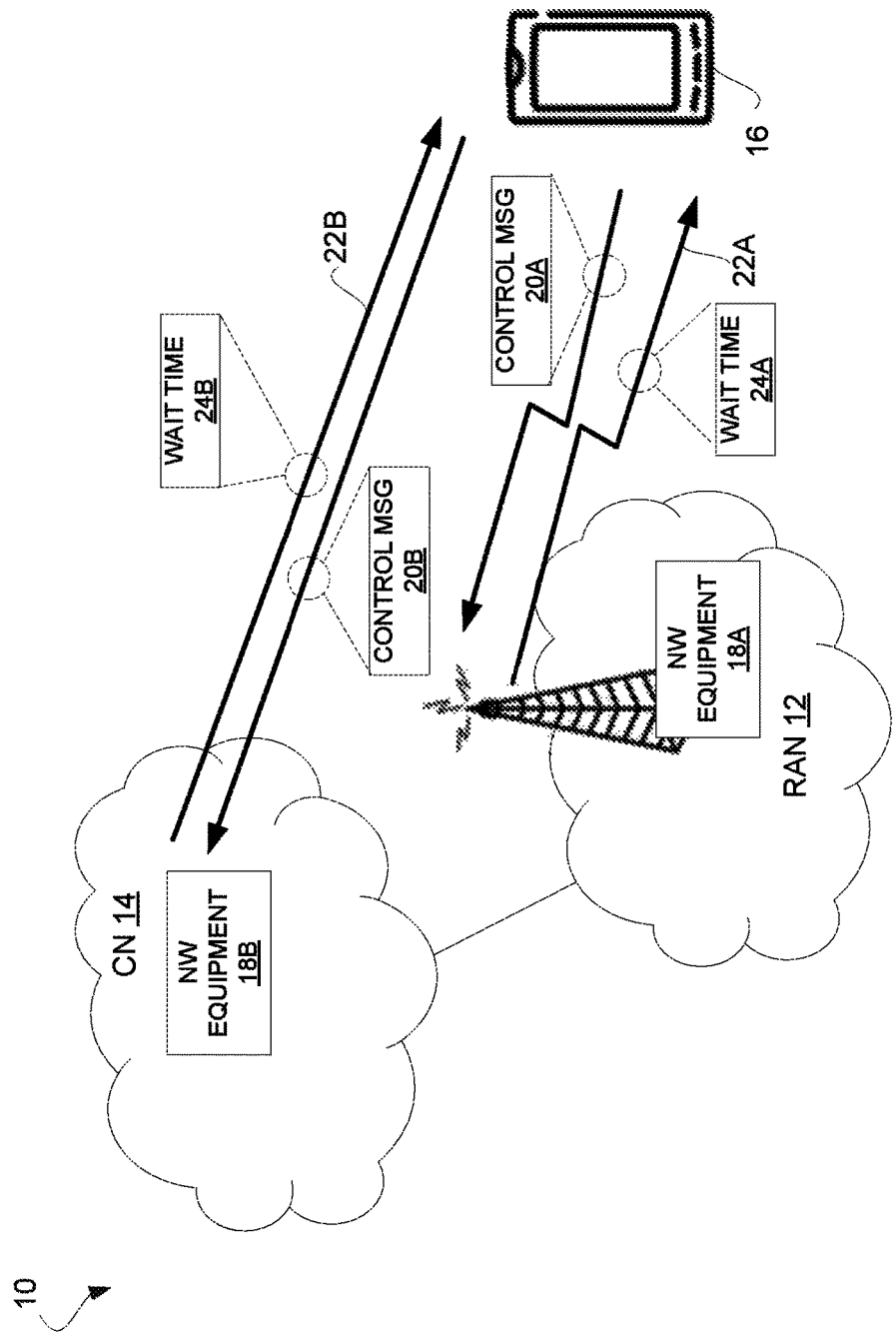
FIG. 1 is a block diagram of a wireless communication system that includes network equipment and a wireless communication device according to some embodiments.

FIG. 1 shows a wireless communication system 10, e.g., a 5G system, according to some embodiments. As shown, the system 10 includes a radio access network, RAN, 12 and a core network, CN, 14. The RAN 12 wirelessly connects one or more wireless communication devices 16 to the CN 14. The CN 14 in turn connects the one or more wireless communication devices 16 to one or more external networks, e.g., a public switched telephone network, PSTN, and/or a packet data network, PDN, such as the Internet.

In some embodiments, the RAN 12 includes network, NW, equipment 18A (e.g., a base station) that is configured to control the timing with which a wireless communication device 16 is to send a control message 20A to the network equipment 18A (or some other network equipment). The NW equipment 18A may control this timing so as to require the wireless communication device 16 to wait a certain time before sending the control message 20A to the NW equipment 18A. The NW equipment 18A in this regard may generate and transmit control signaling 22A that indicates a certain wait time 24A for which the wireless communication device 16 is required to wait before sending the control message 20A to the NW equipment 18A, e.g., relative to the time at which the device 16 receives the control signaling 22A.

In some embodiments, for example, the control signaling 22A is a radio resource control, RRC, connection reject or RRC connection release message, and the control message 20A is an RRC connection request message. In this case, the NW equipment 18A generates and transmits an RRC connection reject or release message to indicate a certain wait time 24A for which the wireless communication device 16 is required to wait before sending an RRC connection request message. Where the wait time 24A is indicated relative to the time at which the device 16 receives the RRC connection reject or release message, for instance, the NW equipment 18A in this way indicates that the time between when the device 16 receives the RRC connection reject or release message and when the device 16 sends (another) RRC connect request message must be at least the certain wait time 24A. The NW equipment 18A may do so responsive to and in order to control congestion in the RAN 12, e.g., by limiting how often devices re-attempt establishment or resumption of RRC connections after rejection/release.

Alternatively or additionally, the CN 14 includes NW equipment 18B (e.g., configured to implement an access and management function, AMF) that is configured to control the timing with which the wireless communication device 16 is to send a control message 20B to the network equipment 18B (or some other network equipment). The NW equipment 18B may control this timing so as to require the wireless communication device 16 to wait a certain time before sending the control message 20B to the NW equipment 18B. The NW equipment 18B in this regard may generate and transmit control signaling 22B that indicates a certain wait time 24B for which the wireless communication device 16 is required to wait before sending the control message 20B to the NW equipment 18B, e.g., relative to the time at which the device 16 receives the control signaling 22B.

In some embodiments, for example, the control signaling 22B is a non-access stratum, NAS, reject message, and the control message 20B is a NAS network registration request message or a NAS service request message. In this case, the NW equipment 18B generates and transmits a NAS reject message to indicate a certain wait time 24B for which the wireless communication device 16 is required to wait before sending a NAS network registration request message or a NAS service request message. Where the wait time 24B is indicated relative to the time at which the device 16 receives the NAS reject message, for instance, the NW equipment 18B in this way indicates that the time between when the device 16 receives the NAS reject message and when the device 16 sends (another) NAS registration request message or NAS service request message must be at least the certain wait time 24B. The NW equipment 18B may do so responsive to and in order to control congestion in the CN 14, e.g., by limiting how often devices re-attempt NAS registration after rejection.

Note of course that although the control signaling 22B and the control message 20B are shown in FIG. 1 as if transmitted between the NW equipment 18B and the wireless communication device 16 directly, they may actually be transmitted (e.g., as higher layer signaling) via the RAN 12.

These embodiments may be generalized as concerning network equipment 18 (in the form of RAN NW equipment 18A or CN NW equipment 18B) which transmits control signaling 22 (in the form of control signaling 22A or 22B) to indicate a certain wait time 24 (in the form of wait time 24A or 24B) for which the wireless communication device 16 is required to wait before sending a control message 20 (in the form of control message 20A or 20B).

Notably, according to some embodiments, a subset of the possible wait times which may be indicated by the control signaling 22 (e.g., relatively large wait times such as those that are larger than a threshold) must be indicated by integrity-protected control signaling. Correspondingly, network equipment 18 may generate the control signaling 22 and the wireless communication device 12 may receive the control signaling 22 in such a way that complies with this requirement of integrity protection for certain wait times. In fact, in some embodiments, the wireless communication device 16 actually polices or enforces the requirement of integrity protection for certain wait times. For example, in order for the wireless communication device 16 to accept any of the possible wait times in the subset as being required before sending the control message 20, the control signaling 22 which indicates any one of those possible wait times to the device 16 must have been integrity protected. In some sense, then, a certain wait time that is included in the subset is only considered as a valid requirement if that wait time was signaled by integrity protected signaling.

In some embodiments, this subset of possible wait times which must be indicated by integrity-protected control signaling includes times larger than a defined threshold and excludes times below the defined threshold, e.g., such that the subset includes possible wait times that are larger relative to the threshold and the subset excludes possible wait times that are smaller relative to the threshold. In one or more embodiments, requiring relatively larger wait times to be signaled via integrity protected signaling guards those more impactful wait times from being misused by an attacker for a denial of service attack. The smaller wait times remain available for controlling the timing of the control message 20 under circumstances where integrity protection of the control signaling 22 cannot be accomplished, e.g., due to lack of a security context for the wireless communication device 16. But, because the wait times which may be signaled without integrity protection are relatively smaller, they may be considerably less effective in a denial of service attack.

More particularly in this regard, FIG. 2A illustrates processing performed by network equipment 18 (i.e., NW equipment 18A or 18B) according to some embodiments. As shown in FIG. 2A, a method 100 performed by network equipment 18 includes generating control signaling 22 (e.g., in the form of an RRC connection request message or RRC connection release message) that indicates a certain time 24 for which the wireless communication device 16 is required to wait before sending a certain control message 20 (to the network equipment 18) (e.g., an RRC connection request message or an RRC connection resume request message). (Block 110). The network equipment 18 generates the control signaling 22 in this way based on a rule that a subset of possible wait times (e.g., relatively large wait times that exceed a threshold) must be indicated by integrity-protected control signaling. In some embodiments, for example, the network equipment 18 determines the certain wait time 24 and/or whether to integrity protect the control signaling 22 based on the rule that a subset of possible wait times must be indicated by integrity-protected control signaling. In any event, the method 100 then includes transmitting the generated control signaling 22 (Block 120).

In some embodiments, the network equipment 18 implements Step 110 of FIG. 2A by performing the steps shown in FIG. 2B. In particular, the network equipment 18 determines whether the control signaling 22 is able to be integrity protected (e.g., based on whether the network equipment 18 has a security context for the device 16) (Block 110A). The network equipment 18 then selects the certain wait time 24 from a set of possible wait times that includes or excludes the subset of possible wait times that must be indicated by integrity-protected control signaling, depending respectively on whether or not the control signaling 22 is able to be integrity protected (Block 110B). For example, if the control signaling 22 is able to be integrity protected, the network equipment 18 may select the certain wait time 24 from a set of possible wait times that includes the subset of possible wait times that must be indicated by integrity-protected control signaling (and that may include one or more other possible wait times outside the subset). On the contrary, if the control signaling 22 is not able to be integrity protected, the network equipment 18 may select the certain wait time 24 from a set of possible wait times that excludes the subset of possible wait times that must be indicated by integrity-protected control signaling. The network equipment 18 thereby complies with the rule that a subset of possible wait times must be indicated by integrity-protected control signaling, by limiting the set of wait times from which the network equipment 18 selects as needed to account for its inability to integrity protect the control signaling 22. In these embodiments, then, the ability or inability of the network equipment 18 to integrity protect the control signaling 22 at least partially drives or influences which wait time the network equipment 18 signals to the wireless communication device 16.

In other embodiments, the network equipment 18 implements Step 110 of FIG. 2A by performing the steps shown in FIG. 2C. In particular, the network equipment 18 may determine the certain wait time 24 to be indicated by the control signaling 22 from a set of possible wait times (Block 110C), and then determine whether or not the control signaling 22 is to be integrity-protected based on whether or not the certain wait time 24 is included in the subset of possible wait times that must be indicated by integrity-protected control signaling (Block 110D). The network equipment 18 may then integrity protect the control signaling 22 or refrain from integrity protecting the control signaling 22 based on that determining of whether or not the control signaling 22 is to be integrity-protected (Block 110E). This may require initiating one or more procedures to be able to integrity protect the control signaling. In these embodiments, then, the network equipment 18 may select the wait time 24 to signal without regard to its ability or inability to integrity protect the control signaling 22, and then integrity protect the control signaling 22 only if required in order to signal the selected wait time 24. The selected wait time 24 thereby drives or influences whether the control signaling 22 is integrity protected.

In any event, the network equipment 18 may generate the control signaling 22 to indicate the wait time 24 in any number of ways. Consider for instance the example shown in FIG. 3A. As shown, the network equipment 18 generates the control signaling 22 in the form of a control message 26. This control message 26 has a wait time field 26A. The wait time field 26 encodes possible wait times within a wait time range 28. FIG. 3A shows the wait time range 28 as including N+M possible wait times; namely, $T_1, T_2, \ldots T_N, T_{N+1}, T_{N+2}, \ldots T_{N+M}$. Possible wait times $T_{N+1}, T_{N+2}, \ldots T_{N+M}$ are those that exceed threshold 30 and that are included in the subset 32 of possible wait times which must be indicated by integrity-protected control signaling. By contrast, possible wait times $T_1, T_2, \ldots T_N$ are those that do not exceed threshold 30 and that are excluded from the subset 32. Accordingly, the network equipment 18 in these embodiments uses the same wait time field 26A to indicate at least some possible wait times excluded from the subset 32, but integrity protects the control message 26 (or at least wait time field 26A) if the wait time field 26A indicates one of the possible wait times $T_{N+1}, T_{N+2}, \ldots T_{N+M}$ included in the subset 32. Although not shown, if a wait time is equal to the threshold 30, some embodiments may include that wait time within the subset 32 whereas other embodiments may exclude that wait time from the subset 32.

FIG. 3B illustrates other embodiments where different types of control messages are usable to indicate at least some possible wait times that are different. As shown, the network equipment 18 generates control signaling 22 in the form of either a first type of control message 34A or a second type of control message 34B, e.g., depending on the wait time 24 to be indicated. The first type of control message 34A is defined for indicating a wait time within a first subset 38A of possible wait times, which as shown in FIG. 3B includes possible wait times $T_1, T_2, \ldots T_N$ within a first range 36A of wait times. The second type of control message 34B is defined for indicating a wait time within a second subset 38B of possible wait times, which as shown in FIG. 3B includes possible wait times $T_{N+1}, T_{N+2}, \ldots T_{N+M}$ within a second range 36B of wait times. In this example, it is the second subset 38B of possible wait times that is the subset of possible wait times which must be indicated by integrity-protected control signaling.

Accordingly, the network equipment 18 in these embodiments may generate the control signaling 22 to comprise the first type of control message 34A or the second type of control message 34B based on whether the wait time 24 to be indicated is included in the second subset 38B, i.e., the subset of possible wait times which must be indicated by integrity-protected control signaling. In embodiments where the first type of control message 34A is usable only to indicate wait times that need not be indicated by integrity-protected control signaling, and where the second type of control message 34B is usable only to indicate wait times that need to be indicated by integrity-protected control signaling, the network equipment 18 may always integrity protect the second type of control message 34B but never integrity protect the first type of control message 34A.

Figure 3D:
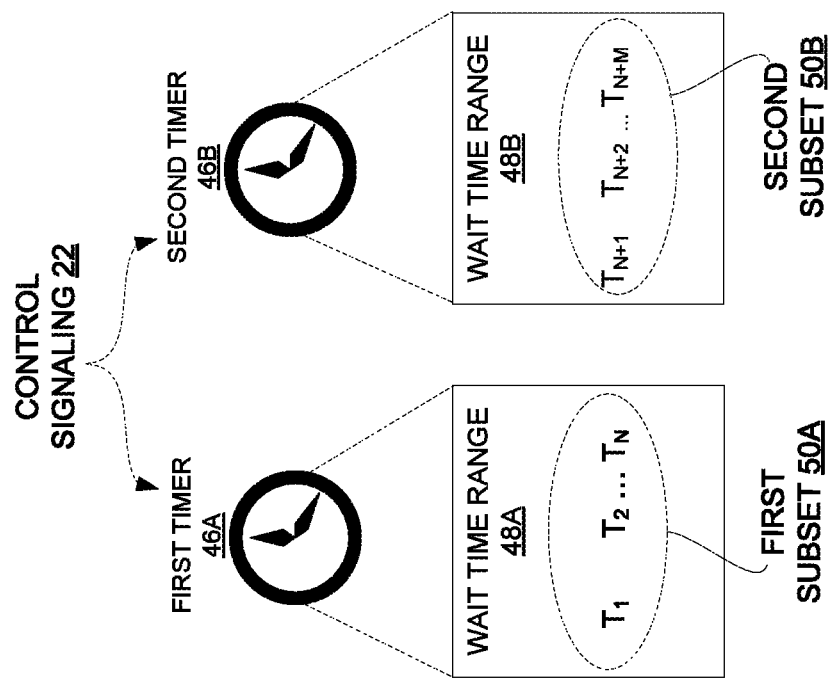
FIG. 3D is a block diagram of different timers at a wireless communication device according to some embodiments.
Figure 3C:
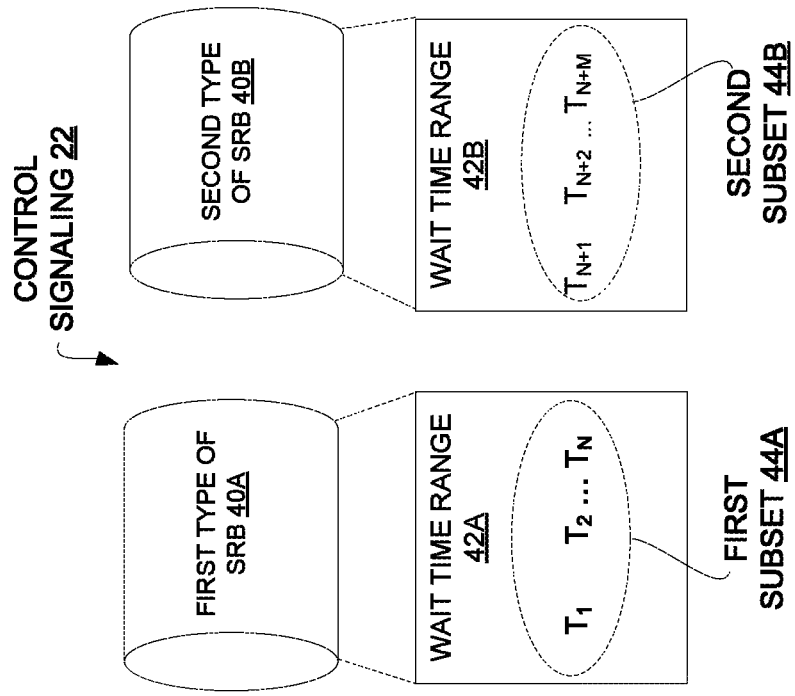
FIG. 3C is a block diagram of different signaling radio bearers according to some embodiments.

In other embodiments, as shown in FIG. 3C, different types of signaling radio bearers (SRBs) are usable to indicate at least some possible wait times that are different. As shown, the network equipment 18 transmits control signaling 22 on either a first type of SRB 40A or a second type of SRB 40B, e.g., depending on the wait time 24 to be indicated. The first type of SRB 40A is defined for indicating a wait time within a first subset 44A of possible wait times, which as shown in FIG. 3C includes possible wait times $T_1, T_2, \ldots T_N$ within a first range 42A of wait times. The second type of SRB 40B is defined for indicating a wait time within a second subset 44B of possible wait times, which as shown in FIG. 3C includes possible wait times $T_{N+1}, T_{N+2}, \ldots T_{N+M}$ within a second range 42B of wait times. In this example, it is the second subset 44B of possible wait times that is the subset of possible wait times which must be indicated by integrity-protected control signaling. Accordingly, the network equipment 18 in these embodiments may transmit the control signaling 22 on the first type of SRB 40A or the second type of SRB 40B based on whether the wait time 24 to be indicated is included in the second subset 38B, i.e., the subset of possible wait times which must be indicated by integrity-protected control signaling. In embodiments where the first type of SRB 40A is usable only to indicate wait times that need not be indicated by integrity-protected control signaling, and where the second type of SRB 40B is usable only to indicate wait times that need to be indicated by integrity-protected control signaling, the network equipment 18 may always integrity protect the control signaling 22 when transmitted on the second type of SRB 40B but never integrity protect the control signaling 22 when transmitted on the first type of SRB 40A.

In some embodiments, a single wait timer is defined at the wireless communication device 16 for tracking or enforcing whatever wait time is indicated by the control signaling 22. In this case, then, the single wait timer may be configurable with any of the wait times $T_1, T_2, \ldots T_{N+M}$, no matter whether included in the subset of possible wait times which must be indicated by integrity-protected control signaling.

FIG. 3D illustrates alternative or additional embodiments where the control signaling 22 indicates that the wireless communication device 16 is to configure one of multiple different timers at the wireless communication device 16 depending on whether the wait time 24 to be indicated is included in the subset of possible wait times which must be indicated by integrity-protected control signaling. As shown, a first timer 46A is defined at the wireless communication device 16 for timing any wait time within a first subset 50A of possible wait times, which as shown in FIG. 3D includes possible wait times $T_1, T_2, \ldots T_N$ within a first range 48A of wait times. The possible wait times in the first subset 50A may for instance be those excluded from the subset of possible wait times which must be indicated by integrity-protected control signaling, e.g., the possible wait times in the first subset 50A may each be less than a threshold. Where the first timer 46A is a countdown timer, the wireless communication device 16 may use the first timer 46A to time any wait time within this first subset 50A by starting the first timer 46A with a value equal to that wait time and monitoring for when the first timer 46A expires. In this case, then, the first timer 46A may have a maximum value at which it can be set that is equal to the largest possible wait time in the first subset 50A (or that is equal to the threshold which the possible wait times in the first subset 50A are each less than).

Similarly, a second timer 46B is defined at the wireless communication device 16 for timing any wait time within a second subset 50B of possible wait times, which as shown in FIG. 3D includes possible wait times $T_{N+1}, T_{N+2}, \ldots T_{N+M}$ within a second range 48B of wait times. The possible wait times in the second subset 50B may for instance be those included in the subset of possible wait times which must be indicated by integrity-protected control signaling, e.g., the possible wait times in the second subset 50B may each be greater than (or equal to) a threshold. Where the second timer 46B is a countdown timer, the wireless communication device 16 may use the second timer 46B to time any wait time within this second subset 50B by starting the second timer 46B with a value equal to that wait time and monitoring for when the second timer 46B expires. In this case, then, the second timer 46B may have a maximum value at which it can be set that is equal to the largest possible wait time in the second subset 50B.

In this example, it is indeed the second subset 50B of possible wait times that is the subset of possible wait times which must be indicated by integrity-protected control signaling. Accordingly, the network equipment 18 in these embodiments may generate the control signaling 22 to indicate that the wireless communication device 16 is to configure the first timer 46A or the second timer 46B based on whether the wait time 24 to be indicated is included in the second subset 50B, i.e., the subset of possible wait times which must be indicated by integrity-protected control signaling. In embodiments where the first timer 46A is usable only to time wait times that need not be indicated by integrity-protected control signaling, and where the second timer 46B is usable only to time wait times that need to be indicated by integrity-protected control signaling, the network equipment 18 may always integrity protect the control signaling 22 when configuring the second timer 46B but never integrity protect the control signaling 22 when configuring the first timer 46A.

Note with respect to FIGS. 3B-3D that, in some embodiments, the range of wait times within the first subset does not overlap with the range of wait times within the second subset. In one example, for instance, each possible wait time in the second subset is greater than each possible wait time in the first subset. In other embodiments, though, the range of wait times within the first subset does overlap with the range of wait times within the second subset. In some of these embodiments, the network equipment 18 may treat the second type of control message 34B as described with respect to the control message in FIG. 3A, e.g., apply integrity protection for certain wait times indicated by the second type of control message 34B but not others. For example, the wait time field 26A of FIG. 3A in this case may constitute a "new" information element (IE) that has the full wait time range 28 from $T_1, T_2, \ldots T_{N+M}$ supported by "new" wireless communication devices. This may contrast with the wait time field of a legacy control message with a legacy IE that has a limited wait time range from $T_1, T_2, \ldots T_N$.

Figure 4:
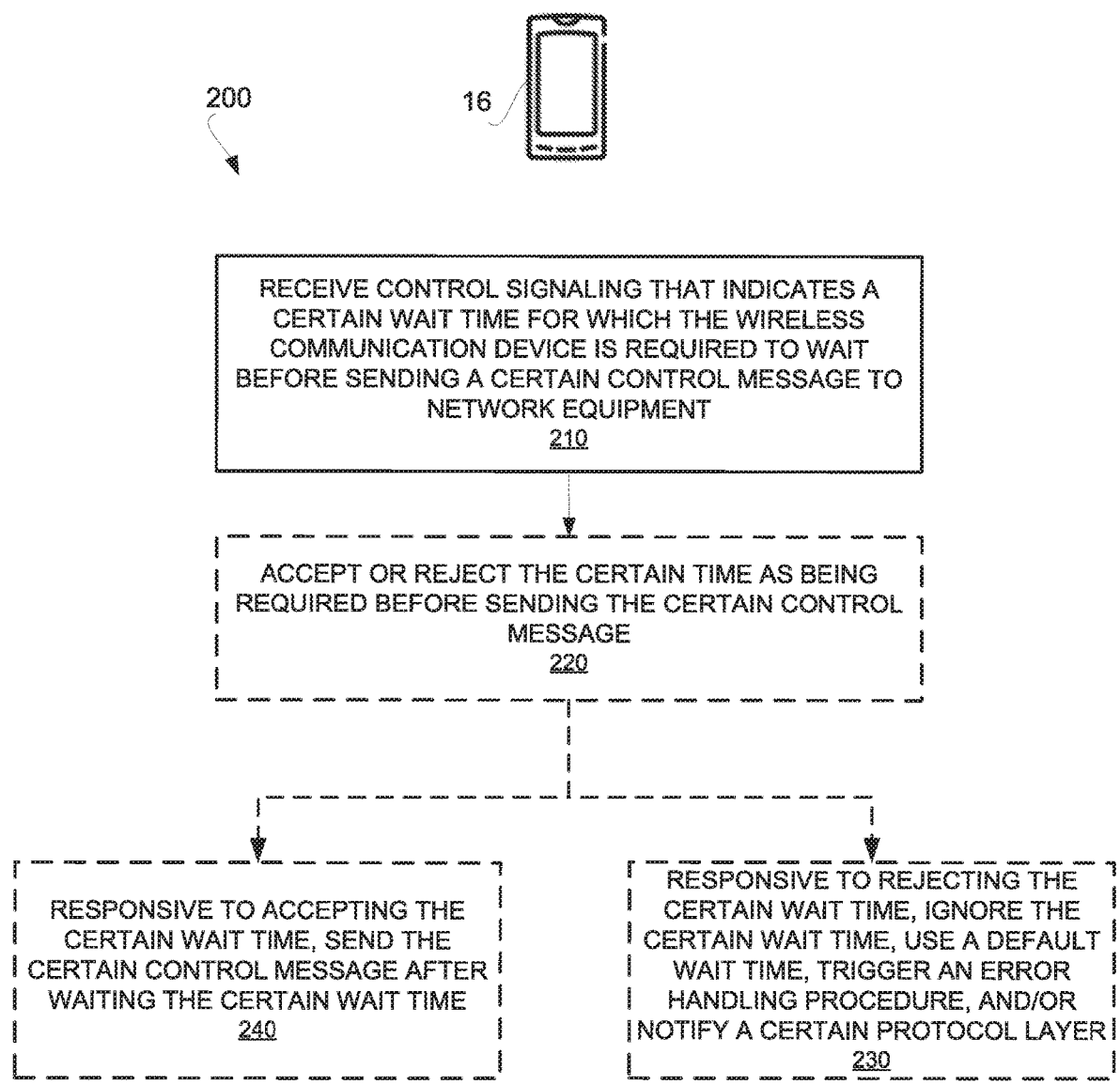
FIG. 4 is a logic flow diagram of a method performed by a wireless communication device according to some embodiments.

FIG. 4 shows a corresponding method 200 performed by a wireless communication device 16 according to some embodiments. As shown, the method 200 includes receiving control signaling 22 that indicates a certain wait time 24 for which the wireless communication device 16 is required to wait before sending a certain control message 20 to network equipment 18 (Block 210). A subset of possible wait times in this regard must be indicated by integrity-protected control signaling. In some embodiments, then, the wireless communication device 16 is configured to receive integrity-protected control signaling that indicates a wait time included in this subset, or to receive non-integrity-protected control signaling indicates a wait time excluded from the subset.

For example, in some embodiments the wireless communication device 16 is configured to receive the first type of control message 34A in FIG. 3B in order to receive an indication of a wait time excluded from the subset and to receive the second type of control message 34B in FIG. 3B in order to receive an indication of a wait time included in the subset. That is, the device 16 is capable of receiving both types of messages, so that the device 16 can be configured with a wait time according to either type of message. In embodiments where the first type of control message 34A is usable only to indicate wait times that need not be indicated by integrity-protected control signaling, and where the second type of control message 34B is usable only to indicate wait times that need to be indicated by integrity-protected control signaling, the wireless communication device 16 may always receive the second type of control message 34B with integrity protection applied (i.e., so as to always check the integrity of the second type of control message 34B) and always receive the first type of control message 34A without integrity protection applied. The wireless communication device 16 may be configured to operate similarly with regard to the first and second SRBs in FIG. 3C.

Regardless, the method 200 in FIG. 4 in some embodiments further includes accepting or rejecting the certain wait time 24 as being required before sending the certain control message 20, based on whether the received control signaling 22 was integrity protected and on whether the certain wait time 24 is included in a subset of possible wait times which must be indicated by integrity-protected control signaling (Block 220). For example, in some embodiments, the method 200 comprises rejecting the certain time 24 responsive to the received control signaling 22 not being integrity protected and the certain time 24 being included in the subset. On the other hand, the method 200 may comprise accepting the certain time 24 responsive to either the received control signaling 22 being integrity protected or the certain time 24 not being included in the subset. This acceptance or rejection may therefore in some embodiments inherently involve determining whether to accept or reject the certain wait time 24 as being required before sending the certain control message 20, based on whether the received control signaling 22 was integrity protected and on whether the certain wait time 24 is included in the subset of possible wait times which must be indicated by integrity-protected control signaling.

In some embodiments, the wireless communication device's acceptance or rejection amounts to effectively determining whether the indicated wait time 24 is valid or invalid as a requirement imposed on the device 16 before sending the certain control message 20. In these and other embodiments, then, the wireless communication device 16 actually polices or enforces the requirement of integrity protection for certain wait times, e.g., if a wait time 24 was not indicated by integrity-protected signaling when it should have been, the device 16 rejects or considers as invalid the wait time 24 and does not hold itself to that wait time.

FIG. 4 in this regard shows that the method 200 in some embodiments further comprises, responsive to rejecting the certain wait time 24, ignoring the certain wait time 24 as being required before sending the certain control message 20, using a default wait time before sending the certain control message 20, triggering an error handling procedure, and/or notifying a certain protocol layer of the rejection (Block 230). Where a default wait time is used, the wireless communication device 16 may be preconfigured with the default wait time, receive dedicated signaling or common signaling (e.g., within system information) that indicates the default wait time, or generate or select the default wait time according to a formula or rule. Alternatively or additionally, the method 200 may comprise, responsive to accepting the indicated wait time 24, sending the certain control message 20 after waiting the certain wait time 24 (Block 240).

In some embodiments, accepting the wait time 24 means that the wireless communication device 16 receives the value of the wait time 24 indicated by the control signaling 22 and sets a wait timer (e.g., timer T302 as defined according to Long Term Evolution and/or New Radio standards) to that value of the wait time 24. By contrast, rejecting the wait time 24 may mean that the wireless communication device 24 receives the value of the wait time 24 indicated by the control signaling 22 but does not set any wait timer (e.g., timer T302) to that value of the wait time 24. That is, even though the wireless communication device 16 receives the wait time 24 indicated by the control signaling 22, the device 16 behaves as if the device 16 did not receive that wait time 24. In some embodiments, as explained above, this means that the device 16 does not wait any amount of time before attempting to access the system 10.

Embodiments herein may use any of one or more communication protocols known in the art or that may be developed, such as IEEE 802.xx, CDMA, WCDMA, GSM, LTE, UTRAN, WiMax, or the like. Accordingly, although sometimes described herein in the context of 5G, the principles and concepts discussed herein are applicable to 4G systems and others.

A wireless communication device 16 is any type of device capable of communicating with another radio node wirelessly over radio signals. A wireless communication device 16 may therefore refer to a user equipment (UE), a mobile station, a laptop, a smartphone, a machine-to-machine (M2M) device, a machine-type communications (MTC) device, a narrowband Internet of Things (IoT) device, etc. That said, although the wireless communication device 16 may be referred to as a UE, it should be noted that the wireless communication device 16 does not necessarily have a "user" in the sense of an individual person owning and/or operating the device. A wireless communication device 16 may also be referred to as a wireless device, a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be generally configured to transmit and/or receive data without direct human interaction.

In an IOT scenario, a wireless communication device 16 as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device 16 as described herein may be comprised in a vehicle and may perform monitoring and/or reporting of the vehicle's operational status or other functions associated with the vehicle.

As used herein, "network equipment" refers to equipment capable, configured, arranged and/or operable to communicate directly or indirectly with a wireless communication device and/or with other equipment in the wireless communication network that enable and/or provide wireless access to the wireless communication device. Examples of network equipment include, but are not limited to, base stations (BSs), radio base stations, Node Bs, multi-standard radio (MSR) radio nodes such as MSR BSs, evolved Node Bs (eNBs), femto base stations, pico base stations, micro base stations, macro base stations, one or more (or all) parts of a distributed radio base station such as centralized digital units and/or remote radio units (which may or may not be integrated with an antenna as an antenna integrated radio), network controllers, radio network controllers (RNCs), base station controllers (BSCs), relay nodes, relay donor node controlling relays, base transceiver stations (BTSs), access points (APs), radio access points, transmission points, transmission nodes, Remote Radio Units (RRUs), Remote Radio Heads (RRHs), nodes in a distributed antenna system (DAS), Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network equipment may represent any suitable device (or group of devices) capable, configured, arranged, and/or operable to enable and/or provide a wireless device access to the wireless communication network or to provide some service to a wireless device that has accessed the wireless communication network. The list above is not intended to express just alternative network equipment, but to express various examples of classes of network equipment as well as examples of specific network equipment.

Note that the network equipment 18 as described above may perform any of the processing herein by implementing any functional means or units. In one embodiment, for example, the network equipment 18 comprises respective circuits or circuitry configured to perform the steps shown in FIGS. 2A, 2B, and/or 2C. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 5A:
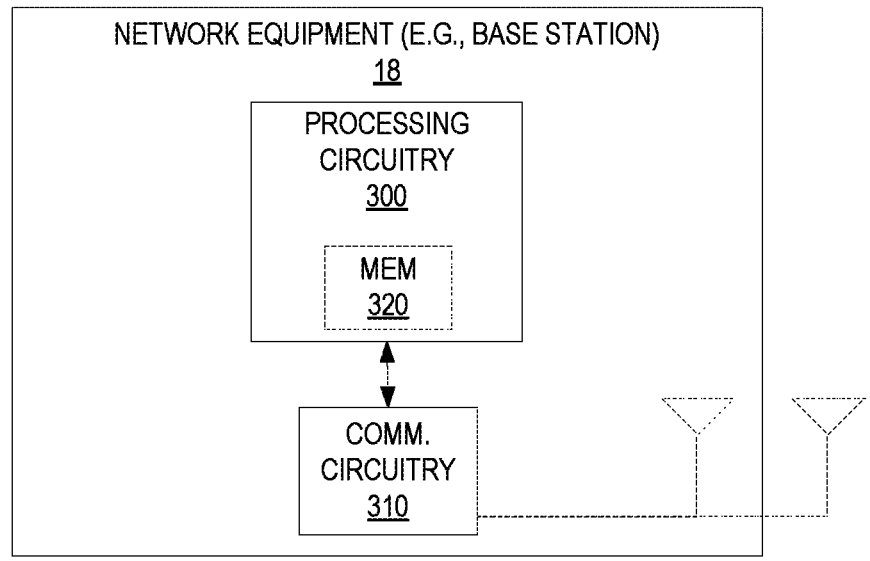
FIG. 5A is a block diagram of network equipment according to some embodiments.

FIG. 5A illustrates network equipment 18 in accordance with one or more embodiments. As shown, the network equipment 18 includes processing circuitry 300 and communication circuitry 310. The communication circuitry 310 is configured to transmit and/or receive information to and/or from one or more other nodes, e.g., via any communication technology. The communication circuitry 310 may do so for instance via one or more antennas, which may be internal or external to the network equipment 18. The processing circuitry 300 is configured to perform processing described above, e.g., in FIGS. 2A, 2B, and/or 2C, such as by executing instructions stored in memory 320. The processing circuitry 300 in this regard may implement certain functional means, units, or modules.

Figure 5B:
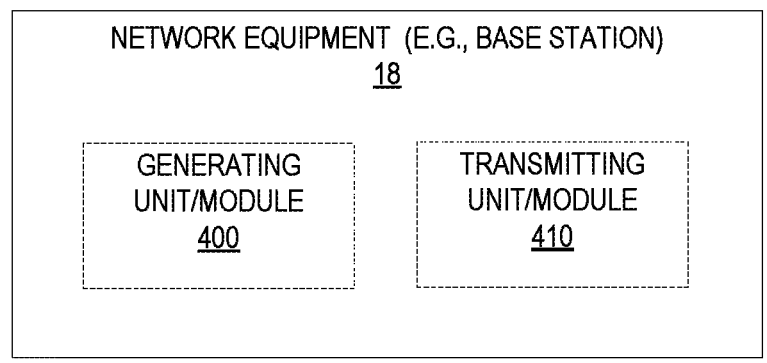
FIG. 5B is a block diagram of network equipment according to other embodiments.

FIG. 5B illustrates a network equipment 18 in accordance with one or more other embodiments. As shown, the network equipment 18 implements various functional means, units, or modules, e.g., via the processing circuitry 300 in FIG. 5A and/or via software code. These functional means, units, or modules, e.g., for implementing the method in FIG. 2A, include for instance a generating unit or module 400 for generating the control signaling 22 as described above and a transmitting unit or module 410 for transmitting that control signaling 22. For example, the generating unit or module 400 may be for generating control signaling 22 that indicates a certain wait time 24 for which a wireless communication device 16 is required to wait before sending a certain control message 20 to the network equipment 18. Such generation may comprises determining the certain wait time 24 and/or whether to integrity protect the control signaling 22 based on a rule that a subset of possible wait times must be indicated by integrity-protected control signaling. And the transmitting unit or module 410 may be for transmitting the generated control signaling 22.

Similarly, a wireless communication device 16 as described above may perform any of the processing herein by implementing any functional means or units. In one embodiment, for example, the wireless communication device 16 comprises respective circuits or circuitry configured to perform the steps shown in FIG. 4. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 6A:
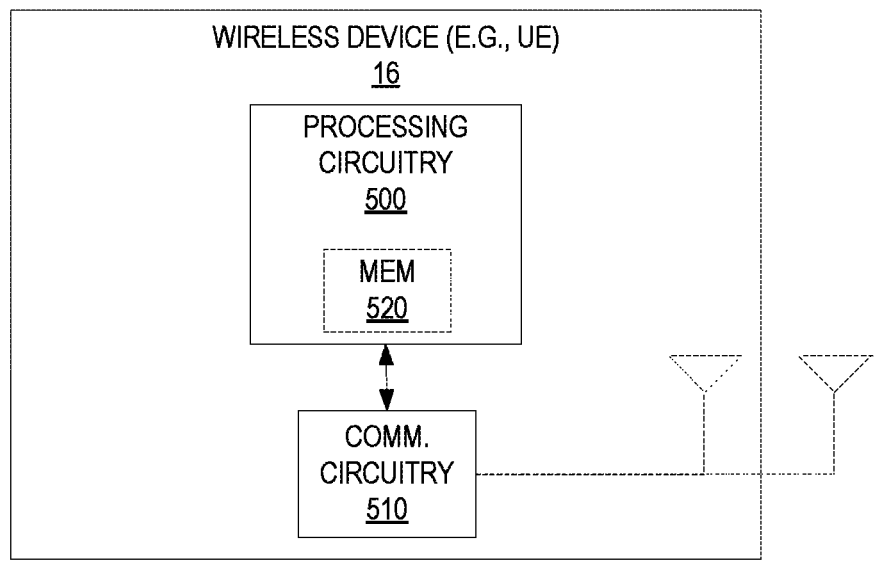
FIG. 6A is a block diagram of a wireless communication device according to some embodiments.

FIG. 6A illustrates a wireless communication device 16 in accordance with one or more embodiments. As shown, the wireless communication device 16 includes processing circuitry 500 and communication circuitry 510. The communication circuitry 510 is configured to transmit and/or receive information to and/or from one or more other nodes, e.g., via any communication technology. The communication circuitry 510 may do so for instance via one or more antennas, which may be internal or external to the wireless communication device 16. The processing circuitry 500 is configured to perform processing described above, e.g., in FIG. 4, such as by executing instructions stored in memory 520. The processing circuitry 500 in this regard may implement certain functional means, units, or modules.

Figure 6B:
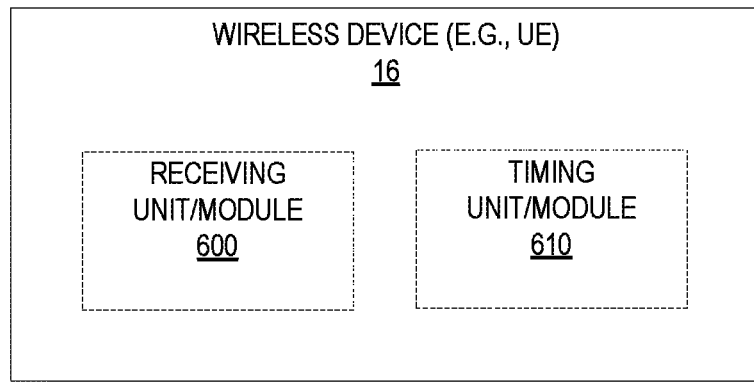
FIG. 6B is a block diagram of a wireless communication device according to other embodiments.

FIG. 6B illustrates a wireless communication device 16 in accordance with one or more other embodiments. As shown, the wireless communication device 16 implements various functional means, units, or modules, e.g., via the processing circuitry 500 in FIG. 6A and/or via software code. These functional means, units, or modules, e.g., for implementing the method in FIG. 4, include for instance a receiving unit or module 600 for receiving the control signaling 22 described above. For example, the receiving unit or module 600 may be for receiving control signaling 22 that indicates a certain wait time 24 for which the wireless communication device 16 is required to wait before sending a certain control message 20 to network equipment 18. A subset of possible wait times in this regard must be indicated by integrity-protected control signaling. In some embodiments, then, the receiving unit or module 600 is configured to receive integrity-protected control signaling that indicates a wait time included in this subset, or to receive non-integrity-protected control signaling indicates a wait time excluded from the subset. In some embodiments, a timing unit or module 610 may be included for accepting or rejecting the certain wait time 24 as being required before sending the certain control message 20, based on whether the received control signaling 22 was integrity protected and on whether the certain wait time 24 is included in the subset of possible wait times which must be indicated by integrity-protected control signaling.

Those skilled in the art will also appreciate that embodiments herein further include corresponding computer programs.

A computer program comprises instructions which, when executed on at least one processor of a network equipment 18 or wireless communication device 16, cause the network equipment 18 or wireless device 16 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of network equipment 18 or wireless communication device 16, cause the network equipment 18 or wireless communication device 16 to perform as described above.

Embodiments further include a computer program product comprising program code portions for performing the steps of any of the embodiments herein when the computer program product is executed by network equipment 18 or a wireless communication device 16. This computer program product may be stored on a computer readable recording medium.

Note that although some embodiments are described with respect to integrity protection, embodiments may apply equally to other forms of protection, especially to the extent that the protection prevents or limits the ability of the control signaling 22 to be misused for a denial of service attack. Other alternative or additional forms of protection applicable to embodiments herein may include for instance ciphering protection.

Note also that although some embodiments are described with respect to a wait time for which the wireless communication device 16 is required to wait before sending a control message, embodiments herein may alternatively or additionally be applied to other device transmissions besides a control message. For example, in some embodiments, the wait time concerns the amount of time for which a wireless communication device is required to wait before performing a certain transmission. The certain transmission may for instance be the transmission of user data, the transmission of a reference signal (e.g., a sounding reference signal), or the transmission of any type of information or signal.

Note further that although embodiments were described above with regard to wait time, embodiments may be applied to other control signaling parameters as well. Indeed, embodiments herein generally restrict the values of a control signaling parameter that are able to be indicated by non-protected control signaling, e.g., to those values whose misuse (e.g., in a denial of service attack) would be less impactful. Broadly, then, some embodiments require a subset of the possible values of a control signaling parameter to be indicated by protected control signaling, and allow other possible values of the control signaling parameter to be indicated by non-protected control signaling. In this sense, then, a value of the control signaling parameter that is included in the protected signaling only subset is deemed valid only if it is received via protected signaling.

Figure 7:
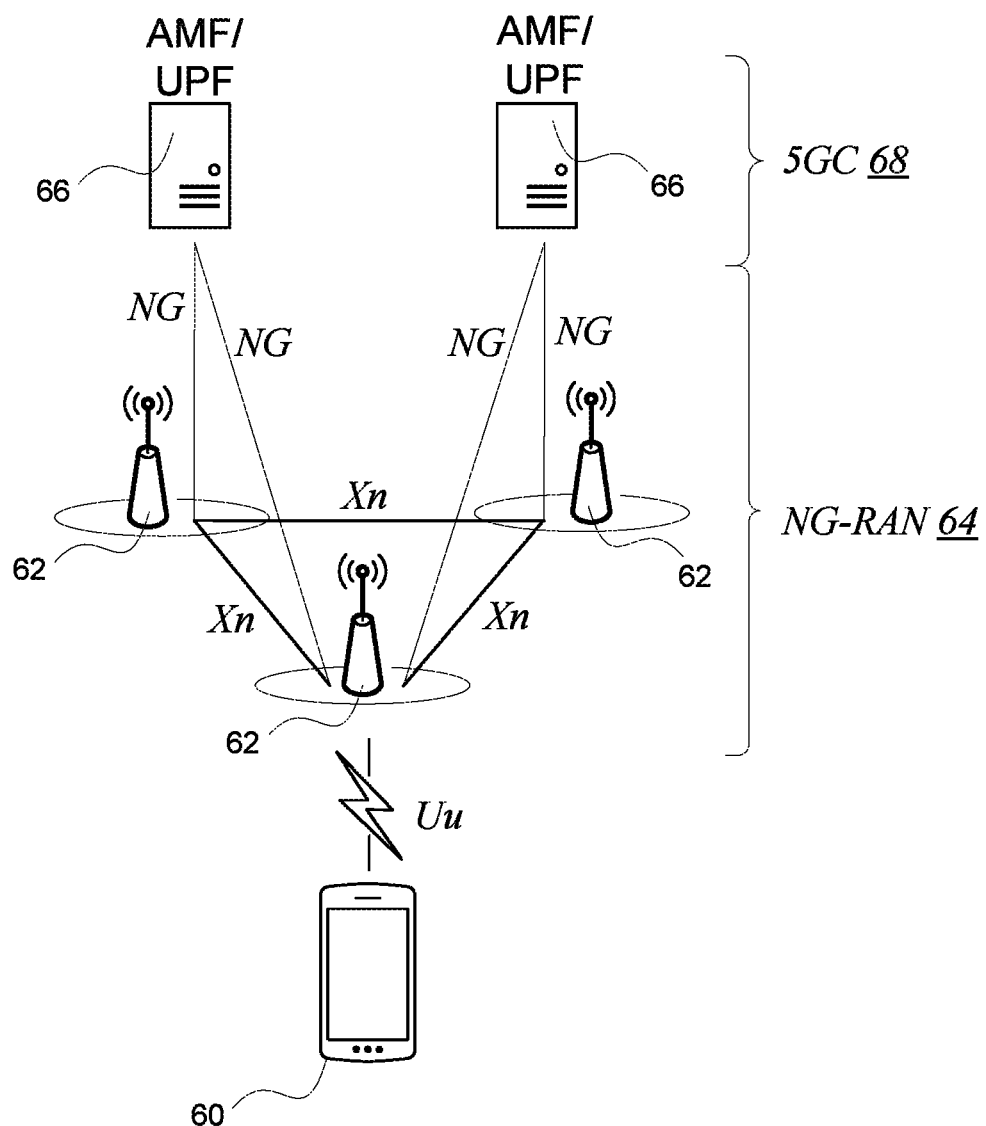
FIG. 7 is a block diagram of an example 5G system according to some embodiments.

Some embodiments herein will now be described in a context of a 5G wireless communication system (e.g., a new radio, NR, system), including for instance a 5G core network (CN or 5GC) and/or a 5G radio access network (RAN or 5G RAN or NG-RAN). FIG. 7 illustrates one example architecture for these embodiments.

As shown in FIG. 7, a user equipment (UE) 60 wirelessly connects over a Uu interface to a RAN node 62 in the NG-RAN 64. Different RAN nodes 62 connect to one another over an Xn interface. Each RAN node 62 in turn connects over an NG interface to an access and mobility function (AMF)/user plane function (UPF) 66 in the 5GC 68. One or more of the RAN nodes 62 may be a gNB that provides 5G user plane and control plane protocol terminations towards the UE 60. One or more others of the RAN nodes 62 may be a ng-eNB that provides E-UTRA user plane and control plane protocol terminations towards the UE and that is connected to the 5GC 68 via the NG interface.

Figure 8:
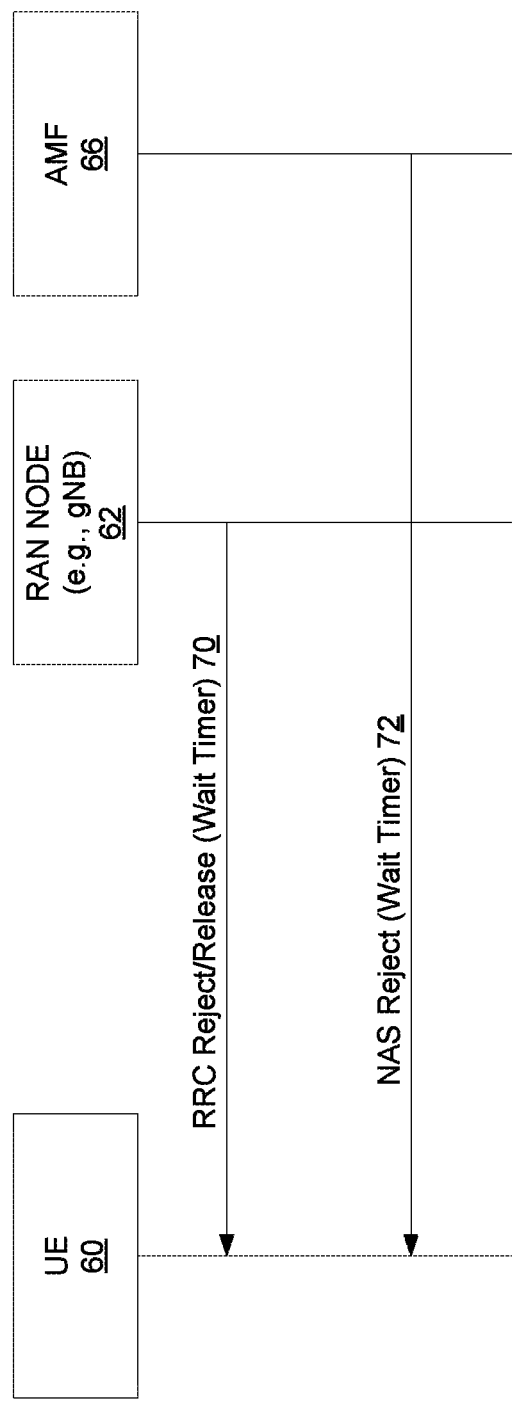
FIG. 8 is a call flow diagram between a UE, a RAN node, and an AMF according to some embodiments.

If congestion is detected in the RAN 64, the RAN node 62 can reject new connections or release existing connections by sending an RRC connection reject or RRC connection release message 70 to the UE 60, as shown in FIG. 8. The message 70 contains a wait timer which specifies the minimum waiting time until the next connection attempt. The exact range of this timer is not decided yet for NR but in LTE it can be set between 1 and 16 s (waitTime) or between 1 and 3000 s (extendedWaitTime). 3GPP TS 36.331 v. 14.2.2. The extended range was introduced in 3GPP Rel-10 for delay tolerant access, i.e., if a UE has been configured for low priority NAS signaling, as defined by a NAS signaling priority tag within the UE's universal subscriber identity module (USIM).

If congestion is detected in the CN 68, the AMF 66 can reject a UE 60 at network registration or service request by sending a NAS registration reject or NAS service reject message 72 to the UE 60, as also shown in FIG. 8. The message 72 contains a wait timer (called backoff timer in the NAS specification) which specifies the minimum waiting time until the next registration or service request attempt. Like the RRC wait timer, the range of the NAS wait timer is not agreed yet for NR but in LTE the value can be up to around 3 hours. 3GPP TS 24.301 v. 14.4.0.

Since the RRC and NAS reject messages 70, 72 can be sent without integrity protection (e.g. in cases there is no security context established, or the network has not obtained an old security context), it is heretofore possible for an attacker to launch a DoS attack against a specific UE or against a set of UEs by setting up a false base station and sending an RRC or NAS reject message with a large wait timer value to the selected UEs. Accordingly, the wait timers in RRC and NAS employed in case of network congestion represent one protocol vulnerability that heretofore is exploitable for DoS attacks.

In some embodiments, to mitigate DoS attacks exploiting the wait timer in the RRC and NAS reject messages, the range of the wait timer is limited for non-integrity protected messages. If the value of the wait timer in the reject message is above a certain limit (e.g. above a threshold) and the message is sent without integrity protection, the UE ignores the wait timer, uses a default value, or triggers error handling procedures. This prevents an attacker from configuring large wait timers and thereby reduces the impact of the attack. Some embodiments ensure that larger values of the wait time can only be signaled to the UE in a secure way and/or by network nodes which have the right UE security context.

Accordingly, some embodiments include a method to mitigate DoS attacks by preventing a fake base station from sending long wait timers to the UE in unprotected RRC or NAS reject messages. Some embodiments include a method performed in the wireless device (UE) for determining if an included wait time is valid. This may include for instance determining if the message which included the wait time was protected by an integrity checksum or not.

Some embodiments improve the resilience against DoS attacks by preventing an attacker from sending long wait timers to the UE in the RRC or NAS reject messages. This ensures UE will continue to have access.

Figure 9:
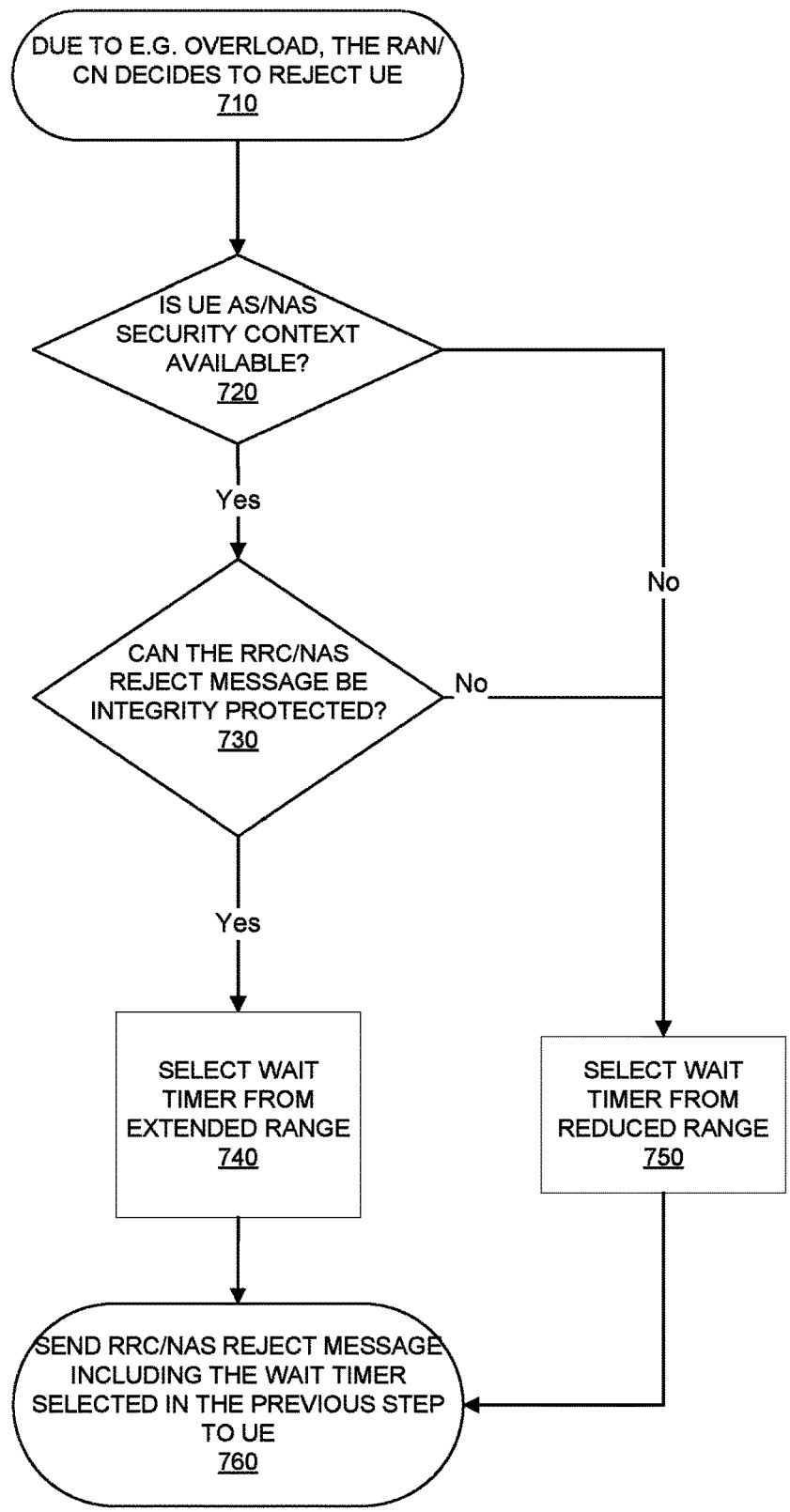
FIG. 9 is a logic flow diagram of network-side processing according to some embodiments.

FIG. 9 is a flow chart illustrating some embodiments for implementing network side processing. As shown, due to for example congestion the network decides to reject a UE with an ongoing connection or that is attempting to send signaling or data (Block 710). To select the wait timer to include in the reject message, the network first checks if the UE security context is available (Block 720) and if the reject message can be sent integrity protected (Block 730). If that is the case, the network may decide to select a wait timer from the extended range (Block 740); otherwise it selects a timer from the limited range (Block 750). The selected wait timer is then included in the reject message and sent to the UE (Block 760). Alternatively, the network can first select the wait timer and if the wait timer is from the extended range the network establishes or retrieves the UE security context and sends the reject message with integrity protection.

The rejection can be performed either by the RAN or the CN. If the RAN rejects the UE, the reject message is sent by the base station (e.g., gNB) and could be an RRC connection reject message or an RRC connection release message or other. The RRC connection reject message is used to reject new RRC connections and is sent in response to an RRC connection establishment/resume request message. The RRC connection release message on the other hand is used to release an existing RRC connection and can be sent at any point in time. The wait timer in this case defines the time the UE must wait until the next connection attempt. The UE security context is the UE AS security context.

If the CN rejects the UE, the reject message is a NAS reject message and is sent by the AMF to reject a network registration request or service request from the UE. The wait timer in this case defines the time until the next registration or service request attempt. The UE security context is the UE NAS security context.

Figure 10:
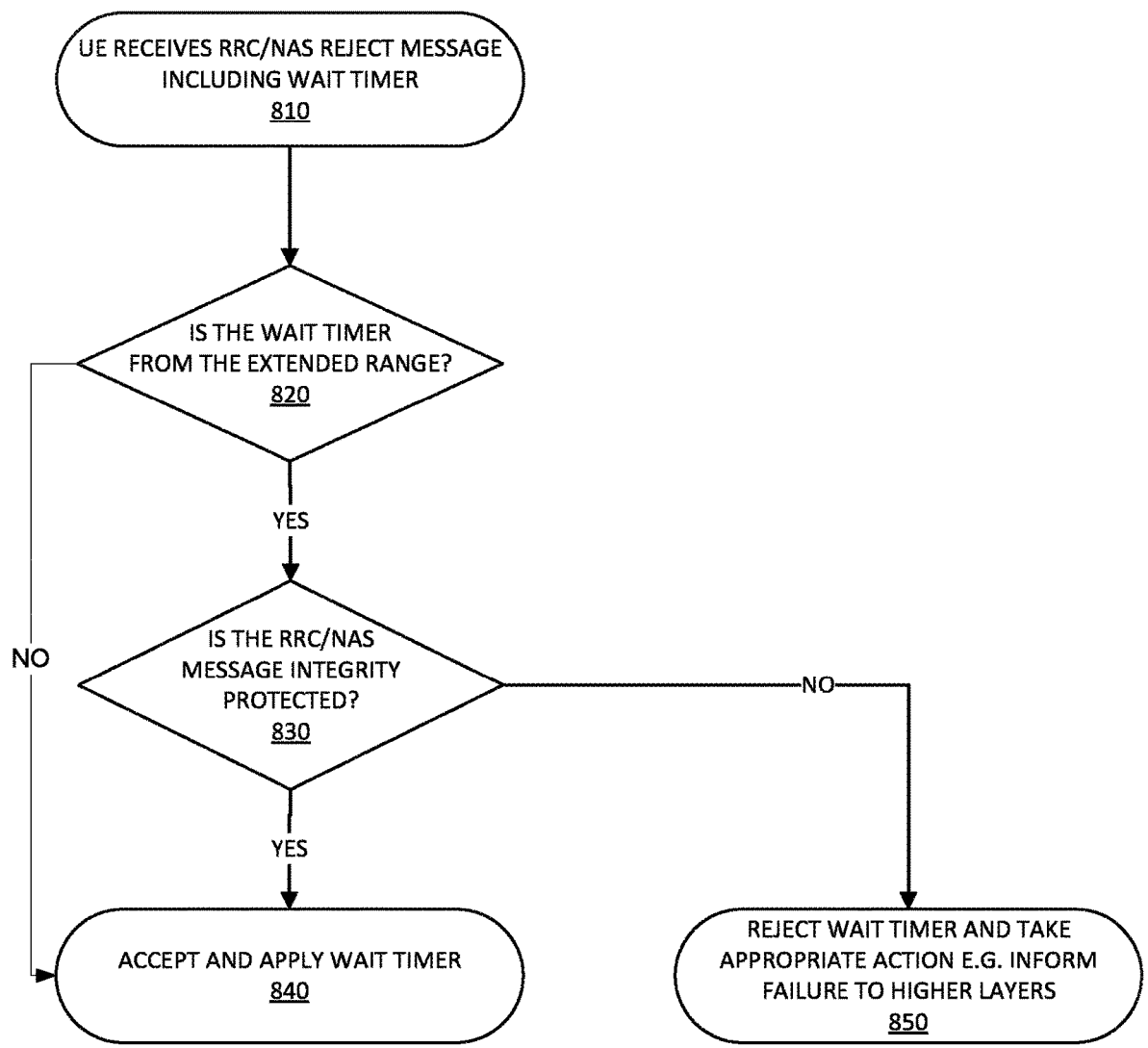
FIG. 10 is a logic flow diagram of UE-side processing according to some embodiments.

FIG. 10 is a flow chart illustrating embodiments for implementing UE-side processing. Upon reception of the reject message from the network (Block 810), the UE checks if the wait timer included in the message is from the extended or limited range, or if the wait time is above a pre-determined threshold (Block 820). If the timer is from the extended range or above the threshold (YES at Block 820), the UE checks if the UE security context is available and the message is integrity protected (Block 830) before it accepts the timer (Block 840). If the message is not integrity protected (NO at Block 830), the UE rejects the timer and takes some appropriate action, e.g. reports the error to higher layers, or applies a default timer value (Block 850).

In case a threshold is used the value of the threshold may either be a pre-defined value in a telecommunication standard or be signaled from the network to the UE in an integrity-protected message.

The way the UE determines if the wait timer is from the limited or extended range may depend on the encoding of the wait timer. Consider a few examples.

In one example, a single wait timer field is used for the limited and extended range. In this case, the UE checks if the field value is greater than some predefined threshold to determine if the extended range is used. For example, in RRC, if the wait timer is encoded as:

waitTime INTEGER (1 . . . 3600)

the UE might consider values larger than say 16 s to be from the extended range.

In another example, separate messages may be defined for the limited and extended wait timer ranges. In this case, the UE distinguishes the range used depending on the message type. In the example below, the first RRC reject message is sent without integrity protected while the second one is sent with integrity protection.

```
RRCConnectionReject/Release ::= SEQUENCE {
        waitTime        INTEGER (1..16)
}
RRCConnectionReject/ReleaseExt ::= SEQUENCE {
        waitTime        INTEGER (1..3600)
}
```

In still another example, separate logical wait timers are defined for the limited and extended range. The extended wait timer is only allowed to be configured if the message is integrity protected. In RRC this might look as follows:

```
waitTime1        INTEGER (1 . . . 16)
waitTime2        INTEGER (1 . . . 3600)
```

Note that if the reject message is an RRC reject message sent by the gNB, the UE can in some cases determine if the message is integrity protected from the logical channel or signaling radio bearer used to transmit the reject message. In this regard, SRB0 is used to transport RRC messages which use the common control channel (CCCH) and is not integrity protected. It is always considered to be present, and is not explicitly configured. SRB1 is used to transport RRC messages which use the dedicated control channel (DCCH) and is integrity protected after access stratum (AS) security activation. It is established during the RRC connection establishment.

In view of the above, embodiments herein generally include a method performed by a wireless communication device configured for use in a wireless communication system. The method comprises receiving control signaling that indicates a certain time for which the wireless communication device is required to wait before sending a certain control message to network equipment; and accepting or rejecting the certain time as being required before sending the certain control message, based on whether the received control signaling was integrity protected and on whether the certain time is included in a subset of possible wait times which must be indicated by integrity-protected control signaling.

In some embodiments, this accepting or rejecting comprises rejecting the certain time responsive to the received control signaling not being integrity protected and the certain time being included in the subset. Alternatively or additionally, this accepting or rejecting comprises accepting the certain time responsive to either the received control signaling being integrity protected or the certain time not being included in the subset.

In some embodiments, the subset of possible wait times includes possible wait times that exceed a defined threshold and excludes possible wait times that do not exceed the defined threshold.

In some embodiments, the control signaling comprises a message with a time field that indicates the certain time, the time field encodes possible wait times within a defined range, possible wait times within the defined range that exceed a defined threshold are included in the subset and possible wait times within the defined range that do not exceed the defined threshold are excluded from the subset, and the method further comprises determining whether the certain time is included in the subset by determining whether the certain time exceeds the defined threshold.

In some embodiments, first and second types of control messages are respectively defined for indicating a time within first and second subsets of possible wait times, the second subset is the subset of possible wait times which must be indicated by integrity-protected control signaling, and the method further comprises determining whether the certain time is included in the subset of possible wait times which must be indicated by integrity-protected control signaling by determining which of the first and second types of control messages the control signaling comprises.

In some embodiments, first and second types of signaling radio bearers are respectively defined for indicating a time within first and second subsets of possible wait times, the second subset is the subset of possible wait times which must be indicated by integrity-protected control signaling, and the method further comprises determining whether the certain time is included in the subset of possible wait times which must be indicated by integrity-protected control signaling by determining which of the first and second types of signaling radio bearers the control signaling comprises.

In some embodiments, each possible wait time in the second subset is greater than each possible wait time in the first subset.

In some embodiments, first and second timers at the wireless communication device are respectively defined for timing a time within first and second subsets of possible wait times, the second subset is the subset of possible wait times which must be indicated by integrity-protected control signaling, and the method further comprises determining whether the certain time is included in the subset of possible wait times which must be indicated by integrity-protected control signaling by determining which of the first and the second timers the control signaling indicates the wireless communication device is to configure for sending the certain control message.

In some embodiments, the method further comprises, responsive to rejecting the certain time, ignoring the certain time as being required before for sending the certain control message, using a default time as being required before for sending the certain control message, triggering an error handling procedure, and/or notifying a certain protocol layer of said rejecting.

In some embodiments, the method further comprises, responsive to accepting the certain time, sending the certain control message after waiting the certain time.

In some embodiments, the certain control message is a radio resource control, RRC, message.

In some embodiments, the certain control message is a connection request message.

In some embodiments, the control signaling is an RRC connection reject message or an RRC connection release message from a radio access network of the wireless communication system.

In some embodiments, the certain control message is a non-access stratum, NAS, message.

In some embodiments, the certain control message is a network registration request message or a service request message.

In some embodiments, the control signaling is a NAS reject message from a core network of the wireless communication system.

Embodiments herein also include a method performed by network equipment configured for use in a wireless communication system. The method comprises generating control signaling that indicates a certain time for which a wireless communication device is required to wait before sending a certain control message to the network equipment, wherein the generating comprises determining the certain time and/or whether to integrity protect the control signaling based on a rule that a subset of possible wait times must be indicated by integrity-protected control signaling; and transmitting the generated control signaling.

In some embodiments, this generating comprises determining the certain time based on a rule that a subset of possible wait times must be indicated by integrity-protected control signaling.

In some embodiments, this generating comprises determining whether the control signaling is able to be integrity protected; and selecting the certain time from a set of possible wait times that includes or excludes the subset of possible wait times that must be indicated by integrity-protected control signaling, depending respectively on whether or not the control signaling is able to be integrity protected.

In some embodiments, this generating comprises determining whether to integrity protect the control signaling based on the rule that the subset of possible wait times must be indicated by integrity-protected control signaling.

In some embodiments, this generating comprises determining the certain time to be indicated by the control signaling from a set of possible wait times; determining whether or not the control signaling is to be integrity-protected based on whether or not the certain time is included in the subset of possible wait times that must be indicated by integrity-protected control signaling; and integrity protecting the control signaling or not based on said determining of whether or not the control signaling is to be integrity-protected.

In some embodiments, the subset of possible wait times includes possible wait times that exceed a defined threshold and excludes possible wait times that do not exceed the defined threshold.

In some embodiments, the control signaling comprises a message with a time field that indicates the certain time, the time field encodes possible wait times within a defined range, possible wait times within the defined range that exceed a defined threshold are included in the subset and possible wait times within the defined range that do not exceed the defined threshold are excluded from the subset, and the method further comprises determining whether the certain time is included in the subset by determining whether the certain time exceeds the defined threshold.

In some embodiments, first and second types of control messages are respectively defined for indicating a time within first and second subsets of possible wait times, the second subset is the subset of possible wait times which must be indicated by integrity-protected control signaling, and the method further generating the control signaling to comprise the first or second type of control message based on whether the certain time is included in the subset of possible wait times which must be indicated by integrity-protected control signaling.

In some embodiments, first and second types of signaling radio bearers are respectively defined for indicating a time within first and second subsets of possible wait times, the second subset is the subset of possible wait times which must be indicated by integrity-protected control signaling, and the method further comprises generating the control signaling to comprise the first or second type of signaling radio bearer based on whether the certain time is included in the subset of possible wait times which must be indicated by integrity-protected control signaling.

In some embodiments, each possible wait time in the second subset is greater than each possible wait time in the first subset.

In some embodiments, first and second timers at the wireless communication device are respectively defined for timing a time within first and second subsets of possible wait times, the second subset is the subset of possible wait times which must be indicated by integrity-protected control signaling, and the method further comprises generating the control signaling to configure the first or the second timer for sending the certain control message based on whether the certain time is included in the subset of possible wait times which must be indicated by integrity-protected control signaling.

In some embodiments, the certain control message is a radio resource control, RRC, message.

In some embodiments, the certain control message is a connection request message.

In some embodiments, the control signaling is an RRC connection reject message or an RRC connection release message from a radio access network of the wireless communication system.

In some embodiments, the certain control message is a non-access stratum, NAS, message.

In some embodiments, the certain control message is a network registration request message or a service request message.

In some embodiments, the control signaling is a NAS reject message from a core network of the wireless communication system.

Embodiments also include a wireless communication device configured for use in a wireless communication system. The wireless communication device is configured to: receive control signaling that indicates a certain time for which the wireless communication device is required to wait before sending a certain control message to network equipment; and accept or reject the certain time as being required before sending the certain control message, based on whether the received control signaling was integrity protected and on whether the certain time is included in a subset of possible wait times which must be indicated by integrity-protected control signaling.

In some embodiments, the wireless communication device is configured to perform the method of any of the device-side embodiments described above.

Embodiments also include network equipment configured for use in a wireless communication system. The network equipment is configured to: generate control signaling that indicates a certain time for which a wireless communication device is required to wait before sending a certain control message to the network equipment, wherein the generating comprises determining the certain time and/or whether to integrity protect the control signaling based on a rule that a subset of possible wait times must be indicated by integrity-protected control signaling; and transmit the generated control signaling.

In some embodiments, the network equipment is configured to perform the method of any of the network-side embodiments above.

Embodiments also include a computer program comprising instructions which, when executed by at least one processor of a wireless communication device, causes the wireless communication device to carry out the method of any of the above device-side embodiments.

Embodiments further include a computer program comprising instructions which, when executed by at least one processor of network equipment, causes the network equipment to carry out the method of any of the network-side embodiments.

Embodiments also include a carrier containing the computer program of any these embodiments. The carrier may be one of an electronic signal, optical signal, radio signal, or computer readable storage medium.

Embodiments moreover include a wireless communication device configured for use in a wireless communication system. The wireless device comprises processing circuitry and a memory, the memory containing instructions executable by the processing circuitry whereby the wireless communication device is configured to: receive control signaling that indicates a certain time for which the wireless communication device is required to wait before sending a certain control message to network equipment; and accept or reject the certain time as being required before sending the certain control message, based on whether the received control signaling was integrity protected and on whether the certain time is included in a subset of possible wait times which must be indicated by integrity-protected control signaling.

In some embodiments, the memory contains instructions executable by the processing circuitry whereby the wireless communication device is configured to perform the method of any of the device-side embodiments above.

Embodiments further include network equipment configured for use in a wireless communication system. The network equipment comprises processing circuitry and a memory, the memory containing instructions executable by the processing circuitry whereby the network equipment is configured to: generate control signaling that indicates a certain time for which a wireless communication device is required to wait before sending a certain control message to the network equipment, wherein the generating comprises determining the certain time and/or whether to integrity protect the control signaling based on a rule that a subset of possible wait times must be indicated by integrity-protected control signaling; and transmit the generated control signaling.

In some embodiments, the memory contains instructions executable by the processing circuitry whereby the network equipment is configured to perform the method of any of the network-side embodiments above.

Embodiments further include a wireless communication device configured for use in a wireless communication system. The wireless communication device comprises a receiving module for receiving control signaling that indicates a certain time for which the wireless communication device is required to wait before sending a certain control message to network equipment; and a timing module for accepting or rejecting the certain time as being required before sending the certain control message, based on whether the received control signaling was integrity protected and on whether the certain time is included in a subset of possible wait times which must be indicated by integrity-protected control signaling.

In some embodiments, the wireless device comprises one or more modules for performing the method of any of the device-side embodiments.

Embodiments also include network equipment configured for use in a wireless communication system. The network equipment comprises a generating module for generating control signaling that indicates a certain time for which a wireless communication device is required to wait before sending a certain control message to the network equipment, wherein the generating comprises determining the certain time and/or whether to integrity protect the control signaling based on a rule that a subset of possible wait times must be indicated by integrity-protected control signaling; and a transmitting module for transmitting the generated control signaling.

In some embodiments, the network equipment comprises one or more modules for performing the method of any of the network-side embodiments above.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A wireless communication device configured for use in a wireless communication system, the wireless device comprising:
processing circuitry and a memory, the memory containing instructions executable by the processing circuitry whereby the wireless communication device is configured to:
receive control signaling that indicates a certain wait time for which the wireless communication device is required to wait before sending a certain control message to network equipment, the received control signaling comprising a message with a wait time field that indicates the certain wait time, the wait time field encoding possible wait times within a range, the possible wait times within the range comprises possible wait times within the range that exceed a threshold and possible wait times within the range that do not exceed the threshold, the possible wait time within the range that exceed the threshold being included in a subset of possible wait times, and the possible wait time within the range that do not exceed the threshold being excluded from the subset of possible wait times, and the wireless communication device further configured to determine whether the certain wait time is included in the subset by determining whether the certain wait time exceeds the threshold; and
one of accept and reject the certain wait time based on whether the control signaling received was integrity protected and on whether the certain wait time is included in the subset of possible wait times, the subset of possible wait times must be indicated by integrity-protected control signaling.

2. The wireless communication device of claim 1, configured to:
reject the certain wait time responsive to the received control signaling not being integrity protected and the certain wait time being included in the subset; and
accept the certain wait time responsive to the certain wait time not being included in the subset.

3. The wireless communication device of claim 1, wherein the subset of possible wait times includes possible wait times that exceed a threshold and excludes possible wait times that do not exceed the threshold.

4. The wireless communication device of claim 1, wherein a first type of control message is defined for indicating a wait time within a first subset of possible wait times, wherein a second type of control message is defined for indicating a wait time within a second subset of possible wait times, wherein the second subset is the subset of possible wait times which must be indicated by the integrity-protected control signaling, and wherein the wireless communication device is further configured to determine whether the certain wait time is included in the subset of possible wait times which must be indicated by the integrity-protected control signaling by determining which of the first and second types of control messages the control signaling comprises.

5. The wireless communication device of claim 4, wherein each possible wait time in the second subset is greater than each possible wait time in the first subset.

6. The wireless communication device of claim 1, wherein a first type of signaling radio bearer is defined for indicating a wait time within a first subset of possible wait times, wherein a second type of signaling radio bearer is defined for indicating a wait time within a second subset of possible wait times, wherein the second subset is the subset of possible wait times which must be indicated by integrity-protected control signaling, and wherein the wireless communication device is further configured to determine whether the certain wait time is included in the subset of possible wait times which must be indicated by integrity-protected control signaling by determining on which of the first and second types of signaling radio bearers the control signaling is received.

7. The wireless communication device of claim 1, wherein a first timer at the wireless communication device is defined for timing a wait time within a first subset of possible wait times, wherein a second timer at the wireless communication device is defined for timing a wait time within a second subset of possible wait times, wherein the second subset is the subset of possible wait times which must be indicated by the integrity-protected control signaling, and wherein the wireless communication device is further configured to determine whether the certain wait time is included in the subset of possible wait times which must be indicated by the integrity-protected control signaling by determining which of the first and the second timers the control signaling indicates the wireless communication device is to configure for sending the certain control message.

8. The wireless communication device of claim 1, further configured to, responsive to rejecting the certain wait time, ignore the certain wait time, use a default wait time, trigger an error handling procedure, and/or notify a certain protocol layer of said rejecting.

9. The wireless communication device of claim 1, further configured to, responsive to accepting the certain wait time, send the certain control message after waiting the certain wait time.

10. The wireless communication device of claim 1, wherein the certain control message is one of a radio resource control, RRC, connection request message and an RRC connection resume request message, and wherein the control signaling is one of an RRC connection reject message and an RRC connection release message from a radio access network of the wireless communication system.

11. The wireless communication device of claim 1, wherein the control signaling is configured to indicate any wait time within the subset of possible wait times and wherein the possible wait times that are excluded from the subset need not be indicated by the integrity-protected control signaling.

12. Network equipment configured for use in a wireless communication system, the network equipment comprising: processing circuitry and a memory, the memory containing instructions executable by the processing circuitry whereby the network equipment is configured to:
generate control signaling that indicates a certain wait time for which a wireless communication device is required to wait before sending a certain control message to the network equipment, the generating comprising determining the certain wait time and whether to integrity protect the control signaling based on a rule that a subset of possible wait times must be indicated by integrity-protected control signaling, the control signaling comprising a message with a wait time field that indicates the certain wait time, the wait time field encoding possible wait times within a range, the possible wait times within the range comprises possible wait times within the range that exceed a threshold and possible wait times within the range that do not exceed the threshold, the possible wait time within the range that exceed the threshold being included in the subset of possible wait times, and the possible wait time within the range that do not exceed the threshold being excluded from the subset of possible wait times, and the network equipment being further configured to determine whether the certain wait time is included in the subset by determining whether the certain wait time exceeds the threshold; and
transmit the generated control signaling to the wireless communication device for the wireless communication device to determine whether to one of accept and reject the certain wait time based on whether the generated control signaling received was integrity protected and on whether the certain wait time is included in the subset of possible wait times, the subset of possible wait times must be indicated by integrity-protected control signaling.

13. The network equipment of claim 12, configured to:
determine whether the generated control signaling is able to be integrity protected; and
select the certain wait time from the subset of possible wait times, the subset of possible wait times being one of including and excluding, the subset of possible wait times that must be indicated by the integrity-protected control signaling, depending respectively on whether or not the control signaling is able to be integrity protected.

14. The network equipment of claim 12, configured to:
determine the certain wait time to be indicated by the control signaling from a set of possible wait times;
determine whether or not the control signaling is to be integrity-protected based on whether or not the certain wait time is included in the subset of possible wait times that must be indicated by the integrity-protected control signaling; and
integrity protect the control signaling or refrain from integrity protecting the control signaling, depending respectively on whether or not the control signaling is to be integrity-protected according to said determining.

15. The network equipment of claim 12, wherein the subset of possible wait times includes the possible wait times that exceed a threshold and excludes the possible wait times that do not exceed the threshold.

16. The network equipment of claim 12, wherein a first type of control message is defined for indicating a wait time within a first subset of possible wait times, where in a second type of control message is defined for indicating a wait time within a second subset of possible wait times, the second subset being the subset of possible wait times which must be indicated by the integrity-protected control signaling, and wherein the network equipment is further configured to generate the control signaling to comprise one of the first and the second type of control message based on whether the certain wait time is included in the subset of possible wait times which must be indicated by the integrity-protected control signaling.

17. The network equipment of claim 16, wherein each possible wait time in the second subset is greater than each possible wait time in the first subset.

18. The network equipment of claim 12, wherein a first type of signaling radio bearer is defined for indicating a wait time within a first subset of possible wait times, wherein a second type of signaling radio bearer is defined for indicating a wait time within a second subset of possible wait times, the second subset being the subset of possible wait times which must be indicated by the integrity-protected control signaling, and wherein the network equipment is further configured to transmit the control signaling on the first or second type of signaling radio bearer based on whether the certain wait time is included in the subset of possible wait times which must be indicated by the integrity-protected control signaling.

19. The network equipment of claim 12, wherein a first timer at the wireless communication device is defined for timing a wait time within a first subset of possible wait times, wherein a second timer at the wireless communication device is defined for timing a wait time within a second subset of possible wait times, the second subset is the subset of possible wait times which must be indicated by the integrity-protected control signaling, and wherein the network equipment is further configured to generate the control signaling to configure the first or the second timer for sending the certain control message based on whether the certain wait time is included in the subset of possible wait times which must be indicated by the integrity-protected control signaling.

20. The network equipment of claim 12, wherein the control signaling is one of an RRC connection reject message and an RRC connection release message from a radio access network of the wireless communication system, wherein the certain control message is one of a radio resource control, RRC, connection request message and an RRC connection resume request message, and wherein the network equipment comprises radio access network equipment.

21. The network equipment of claim 12, wherein the control signaling is configured to indicate any wait time within the subset of possible wait times and wherein the possible wait times that are excluded from said subset need not be indicated by integrity-protected control signaling.

22. A method performed by a wireless communication device configured for use in a wireless communication system, the method comprising:
receiving control signaling that indicates a certain wait time for which the wireless communication device is required to wait before sending a certain control message to network equipment, the received control signaling comprising a message with a wait time field that indicates the certain wait time, the wait time field encoding possible wait times within a range, the possible wait times within the range comprises possible wait times within the range that exceed a threshold and possible wait times within the range that do not exceed the threshold, the possible wait time within the range that exceed the threshold being included in a subset of possible wait times, and the possible wait time within the range that do not exceed the threshold being excluded from the subset of possible wait times, and the wireless communication device further configured to determine whether the certain wait time is included in the subset by determining whether the certain wait time exceeds the threshold; and
one of accepting and rejecting the certain wait time based on whether the received control signaling was integrity protected and on whether the certain wait time is included in the subset of possible wait times, the subset of possible wait times must be indicated by integrity-protected control signaling.

23. The method of claim 22, comprising:
rejecting the certain wait time responsive to the received control signaling not being integrity protected and the certain wait time being included in the subset; or
accepting the certain wait time responsive to the certain wait time not being included in the subset.

24. The method of claim 22, wherein the subset of possible wait times includes possible wait times that exceed a threshold and excludes possible wait times that do not exceed the threshold.

25. A method performed by network equipment configured for use in a wireless communication system, the method comprising:
generating control signaling that indicates a certain wait time for which a wireless communication device is required to wait before sending a certain control message to the network equipment, the generating comprising determining the certain wait time and whether to integrity protect the control signaling based on a rule that a subset of possible wait times must be indicated by integrity-protected control signaling, the control signaling comprising a message with a wait time field that indicates the certain wait time, the wait time field encoding possible wait times within a range, the possible wait times within the range comprises possible wait times within the range that exceed a threshold and possible wait times within the range that do not exceed the threshold, the possible wait time within the range that exceed the threshold being included in the subset of possible wait times, and the possible wait time within the range that do not exceed the threshold being excluded from the subset of possible wait times, and the network equipment being further configured to determine whether the certain wait time is included in the subset by determining whether the certain wait time exceeds the threshold; and
transmitting the generated control signaling to the wireless communication device to determine by the wireless communication device whether to accept or reject the certain wait time based on whether the control signaling received was integrity protected and on whether the certain wait time is included in the subset of possible wait times, the subset of possible wait times must be indicated by integrity-protected control signaling.

26. The method of claim 25, comprising:
determining whether the control signaling is able to be integrity protected; and
selecting the certain wait time from a the subset of possible wait times, the subset of possible wait times being one of including and excluding, the subset of possible wait times which must be indicated by the integrity-protected control signaling, depending respectively on whether or not the control signaling is able to be integrity protected.

* * * * *